(12) United States Patent
Gurpinar et al.

(10) Patent No.: US 7,876,705 B2
(45) Date of Patent: Jan. 25, 2011

(54) METHOD AND APPARATUS AND PROGRAM STORAGE DEVICE FOR GENERATING A WORKFLOW IN RESPONSE TO A USER OBJECTIVE AND GENERATING SOFTWARE MODULES IN RESPONSE TO THE WORKFLOW AND EXECUTING THE SOFTWARE MODULES TO PRODUCE A PRODUCT

(75) Inventors: Omer Gurpinar, Denver, CO (US); Selim Djandji, Sugar Land, TX (US); Thomas Reid Miller, Wallingford (GB); Thomas James Neville, Houston, TX (US)

(73) Assignee: Schlumberger Technology Corporation, Houston, TX (US)

( * ) Notice: Subject to any disclaimer, the term of this patent is extended or adjusted under 35 U.S.C. 154(b) by 1904 days.

(21) Appl. No.: 10/726,288

(22) Filed: Dec. 2, 2003

(65) Prior Publication Data

US 2004/0268338 A1 Dec. 30, 2004

Related U.S. Application Data

(60) Provisional application No. 60/482,511, filed on Jun. 25, 2003.

(51) Int. Cl.
*G01V 1/40* (2006.01)
*G06G 7/48* (2006.01)

(52) U.S. Cl. .............................. 370/254; 702/6; 703/10

(58) Field of Classification Search .................. 370/252, 370/255, 241, 254; 702/1, 2, 5, 6, 14; 703/6, 703/9, 10
See application file for complete search history.

(56) References Cited

U.S. PATENT DOCUMENTS 4,333,144 A 6/1982 Whiteside et al.

(Continued)

FOREIGN PATENT DOCUMENTS

EP 0491367 A2 6/1992

(Continued)

OTHER PUBLICATIONS

International Search Report dated Jun. 6, 2008 for International Application No. PCT/US04/20731 (1 page).

(Continued)

*Primary Examiner*—Aung S Moe
*Assistant Examiner*—Feben Haile
(74) *Attorney, Agent, or Firm*—John Bouchard; Osha Liang LLP

(57) ABSTRACT

A Single Well Predictive Model (SWPM) software based computer system stores a Single Well Predictive Model (SWPM) software therein. When the SWPM software is executed, the SWPM computer system will: (1) automatically produce a first specific workflow comprised of a first plurality of software modules in response to a first set of user objectives and automatically execute the first specific workflow in response to a first set of input data to produce a first desired product, and (2) automatically produce a second specific workflow comprised of a second plurality of software modules in response to a second set of user objectives and automatically execute the second specific workflow in response to a second set of input data to produce a second desired product. There is no longer any need to separately and independently execute the first plurality of software modules of the first workflow in order to produce the first desired product, and there is no longer any need to separately and independently execute the second plurality of software modules of the second workflow in order to produce the second desired product. A considerable amount of time and labor is saved.

27 Claims, 13 Drawing Sheets

U.S. PATENT DOCUMENTS

| | | | |
|---|---|---|---|
| 4,969,130 | A | 11/1990 | Wason et al. |
| 6,317,654 | B1 | 11/2001 | Gleeson et al. |
| 6,412,577 | B1 | 7/2002 | Chen |
| 6,662,109 | B2 | 12/2003 | Roggero et al. |
| 7,539,625 | B2 | 5/2009 | Klumpen et al. |
| 7,561,997 | B1 | 7/2009 | Miller |
| 7,725,302 | B2 | 5/2010 | Ayan et al. |
| 2002/0055868 | A1* | 5/2002 | Dusevic et al. ............ 705/9 |
| 2002/0067373 | A1 | 6/2002 | Roe et al. |
| 2003/0028325 | A1* | 2/2003 | Roggero et al. ........... 702/11 |
| 2005/0119911 | A1 | 6/2005 | Ayan |

FOREIGN PATENT DOCUMENTS

| | | |
|---|---|---|
| RU | 2208153 | 7/2003 |
| RU | 2216043 | 11/2003 |
| WO | 2005001661 A2 | 1/2005 |

OTHER PUBLICATIONS

Primavera Project Planner as evidenced by at least Primavera Project Planning and Control Guide Version 3.0 (1999), pp. 40, 53, 62-66, 79, 193.

Sriramdas S., Systems Analysis of Drilling Engineering and Management to Design a Relational Database, UMI Microform, MI, (1998), Seation 2.1.1, p. 7; FIGS. 3.2, 7.1; Section 5.4.5, p. 59; Table 7.6.

* cited by examiner

METHOD AND APPARATUS AND PROGRAM STORAGE DEVICE FOR GENERATING A WORKFLOW IN RESPONSE TO A USER OBJECTIVE AND GENERATING SOFTWARE MODULES IN RESPONSE TO THE WORKFLOW AND EXECUTING THE SOFTWARE MODULES TO PRODUCE A PRODUCT

CROSS REFERENCE TO RELATED APPLICATIONS

This application is a Utility Application of prior Provisional Application Ser. No. 60/482,511 filed Jun. 25, 2003 and entitled 'Single Well Predictive Model (SWPM)'.

BACKGROUND OF THE INVENTION

The subject matter of the present invention relates to a software package stored in the memory of a workstation or other computer system, hereinafter called the "Single Well Predictive Model" or "SWPM", which will enable a user to introduce a first user objective and a first set of input data, a processor in the computer system executing the SWPM software in response to the first user objective and first set of input data, the SWPM software generating a first specific workflow in response the first user objective and executing a first plurality of software modules which comprise the first specific workflow utilizing the first set of input data to thereby generate a first product or a result of the execution, the SWPM software generating a second specific workflow in response a second user objective and executing a second plurality of software modules which comprise the second specific workflow utilizing a second set of input data to thereby generate a second product or result of the execution.

Generally speaking, during the execution of software in a processor of a computer system for the purpose of generating a final desired product, it is often necessary to execute a first software module in the processor of the computer system to produce a first product and then, separately and independently, execute a second software module in the processor in response to the first product to produce a second product, and then, separately and independently, execute a third software module in the processor in response to the second product to produce the final desired product. In order to produce the final desired product, it may be necessary to separately and independently execute in the processor of the computer system a multitude of software modules in order to produce the final desired product. The aforementioned execution of the multitude of software modules, in a separate and independent fashion, is very time consuming and is a very laborious task.

Accordingly, there exists a need for a 'software based computer system' (hereinafter called the 'Single Well Predictive Model' or 'SWPM') that will: (1) automatically produce a first specific workflow comprised of a first plurality of software modules in response to a first set of user objectives and automatically execute the first specific workflow in response to a first set of input data to produce a first desired product, and (2) automatically produce a second specific workflow comprised of a second plurality of software modules in response to a second set of user objectives and automatically execute the second specific workflow in response to a second set of input data to produce a second desired product.

When the SWPM software based computer system is utilized, there would no longer be any need to separately and independently execute the first plurality of software modules of the first workflow in order to produce the first desired product, and there would no longer be any need to separately and independently execute the second plurality of software modules of the second workflow in order to produce the second desired product. As a result, a considerable amount of processor execution time would be saved and, in addition, there would no longer be any need to perform the aforementioned laborious task of separately and independently executing a plurality of software modules in order to produce a final desired product.

The aforementioned 'software based computer system' of the present invention, known as the 'Single Well Predictive Model' or 'SWPM', is adapted for use in the oil industry. In the oil industry, ideally, all production activities performed in connection with a well should utilize any knowledge concerning the reservoir (e.g., timely pressure interference and rock heterogeneity) adjacent to the well being drilled. However, as a result of the absence of a common three-dimensional (3D) predictive model that can be used not only by reservoir engineers but also by production/drilling/well services engineers, the gap between the reservoir knowledge and day-to-day well decisions remains one of the most significant sources of inefficiency in field management and in field operations. Due to a similar gap between reservoir modeling and production modeling, it is our understanding that clients rarely utilize much of the data that has been acquired—they certainly don't maximize what can be interpreted from that data. Furthermore, most of the reservoirs do not have a realistic reservoir predictive model. It is estimated that only 20% of producing reservoir fields have a reservoir model. This indicates that most of the reservoir fields are operated on the basis of knowledge about individual wells. There are a number of reasons for this, chief among them being: the need for necessary experienced personnel, the need for 'fit-for-purpose' software, the sheer size of the reservoir models, and the time required.

Accordingly, there exists a need for a 'Single Well Predictive Model' or 'SWPM' software based computer system that will enable a company's staff to get closer to well operations while empowering them with fast interpretation tools utilizing all available data and 3D reservoir models built around a specific well thus enhancing the quality of decisions in field management. The 'SWPM' software based computer system represents an opportunity for a company to differentiate itself in the market by 'adding value', where such value is added by introducing a new interpretation service (i.e., the SWPM software) to the company's current and future data acquisition tools and services. In addition, the 'real-time capability' associated with the 'Single Well Predictive Model (SWPM)' software based computer system will be appreciated and utilized significantly in the oil industry because the oil industry as a whole is rapidly progressing toward an 'on-time' and 'data-to-decision' work environment. Finally, the attributes of the 'SWPM' software based computer system of the present invention, including integration and interactiveness and intuitiveness, will be considered when the next generation of 'field predictive models' is created. In addition, there exists a need for an interactive and intuitive flow simulation based 'Single Well Predictive Model (SWPM)' which is used for the purpose of integrating static and dynamic measurements with completion data that can be used by non-reservoir simulation experts. The SWPM will enable the building of 3-D comparative prediction models starting from 1-D information (i.e. from the well). The SWPM will read the formation information of the subject well and create a reservoir flow model for the selected drainage area of the well. From 1 D to 3D, property creation will be done stochastically and then fine-tuned with respect to the available dynamic data of the well. Once the most likely reservoir properties are estimated, SWPM can be used to investigate various predictive scenarios, such as customizing completion strategy, investigating drilling strategy, predicting well performance considering the impact on the reservoir, demonstrating the value of additional data on decision making, and demonstrating the value of new technologies. SWPM will be built around optimized workflows including, petrophysical property estimation, static model construction, model tuning, drilling, completion, production, or intervention. Ease of use and intuitiveness are of utmost importance. SWPM will be used either sequentially in elapsed time mode, or in filly automatic real-time mode.

SUMMARY OF THE INVENTION

Accordingly, one aspect of the present invention involves a method for determining a desired product corresponding to a user objective, comprising the steps of: (a) providing a first user objective; (b) providing a first set of input data; (c) automatically generating a first workflow in response to the first user objective; (d) automatically selecting one or more software modules in response to the first workflow; (e) executing the one or more software modules in a processor in response to the first set of input data; and (f) determining a first desired product in response to the executing step (e).

A further aspect of the present invention involves a program storage device readable by a machine tangibly embodying a set of instructions executable by the machine to perform method steps for determining a desired product corresponding to a user objective, the method steps comprising: (a) receiving a first user objective; (b) receiving a first set of input data; (c) automatically generating a first workflow in response to the first user objective; (d) automatically selecting one or more software modules in response to the first workflow; (e) executing the one or more software modules in a processor in response to the first set of input data; and (f) determining a first desired product in response to the executing step (e).

A further aspect of the present invention involves a system responsive to a set of input data and a user objective adapted for generating a desired product corresponding to the user objective, comprising: first apparatus adapted for receiving a first user objective and a first set of input data; second apparatus adapted for automatically generating a first workflow in response to the first user objective; third apparatus adapted for automatically selecting one or more software modules in response to the first workflow; and processor apparatus adapted for automatically executing the one or more software modules in response to the first set of input data and generating a first desired product in response to the execution of the one or more software modules.

A further aspect of the present invention involves a method for determining a final product in response to a user objective, comprising the steps of: (a) providing the user objective and providing input data; (b) generating a specific workflow corresponding to the user objective; (c) selecting a plurality of software modules in response to the specific workflow, the plurality of software modules having a predetermined sequence; (d) executing the plurality of software modules in the predetermined sequence in response to the input data; and (e) generating the final product when the execution of the plurality of software modules in the predetermined sequence is complete.

A further aspect of the present invention involves a program storage device readable by a machine tangibly embodying a set of instructions executable by the machine to perform method steps for determining a final product in response to a user objective, the method steps comprising: (a) providing the user objective and providing input data; (b) generating a specific workflow corresponding to the user objective; (c) selecting a plurality of software modules in response to the specific workflow, the plurality of software modules having a predetermined sequence; (d) executing the plurality of software modules in the predetermined sequence in response to the input data; and (e) generating the final product when the execution of the plurality of software modules in the predetermined sequence is complete.

A further aspect of the present invention involves a system adapted for determining a final product in response to a user objective, comprising: first apparatus adapted for receiving the user objective and receiving input data; second apparatus adapted for generating a specific workflow corresponding to the user objective; third apparatus adapted for selecting a plurality of software modules in response to the specific workflow, the plurality of software modules having a predetermined sequence; fourth apparatus adapted for executing the plurality of software modules in the predetermined sequence in response to the input data; and fifth apparatus adapted for generating the final product when the execution of the plurality of software modules in the predetermined sequence is complete.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DETAILED DESCRIPTION

Figure 1:
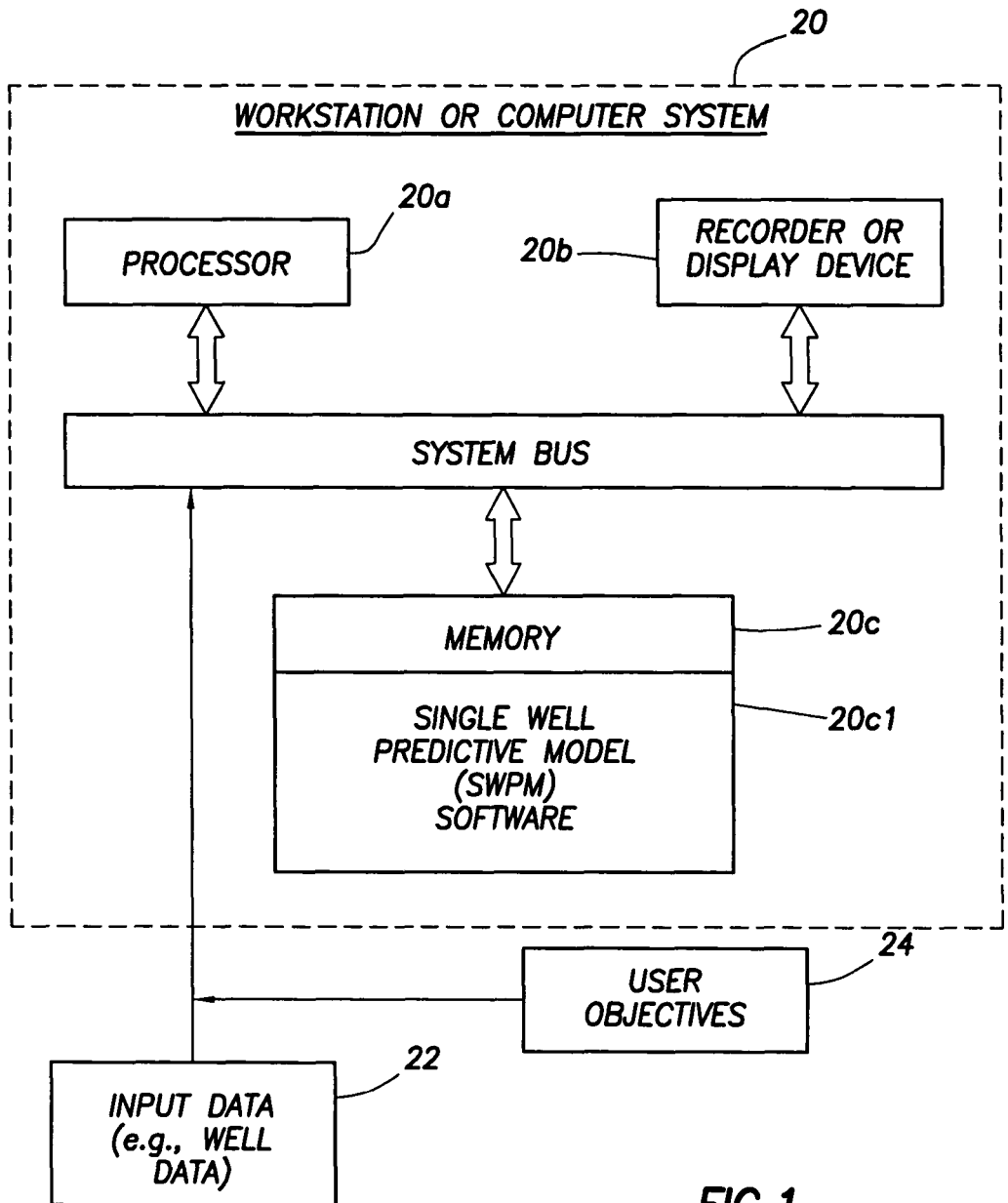
FIG. 1 illustrates a workstation or other computer system representing the Single Well Predictive Model (SWPM) software based computer system of the present invention.

The Single Well Predictive Model (SWPM) software based computer system of the present invention, which stores the Single Well Predictive Model (SWPM) software of the present invention will: (1) automatically produce a first specific workflow comprised of a first plurality of software modules in response to a first set of user objectives and automatically execute the first specific workflow in response to a first set of input data to produce a first desired product, and (2) automatically produce a second specific workflow comprised of a second plurality of software modules in response to a second set of user objectives and automatically execute the second specific workflow in response to a second set of input data to produce a second desired product. As a result, there is no longer any need to separately and independently execute the first plurality of software modules of the first workflow in order to produce the first desired product, and there is no longer any need to separately and independently execute the second plurality of software modules of the second workflow in order to produce the second desired product. As a result, a considerable amount of processor execution time is saved and, in addition, there is no longer any need to perform the aforementioned laborious task of separately and independently executing a plurality of software modules in order to produce a final desired product.

In addition, the Single Well Predictive Model (SWPM) software based computer system of the present invention, which stores the Single Well Predictive Model (SWPM) software of the present invention, will provide a workflow for the less specialized engineer for the purpose of building a model intuitively which can subsequently be used to predict production performance. The SWPM software of the present invention includes four modules: (1) a Data Entry module used for the purpose of introducing 'input data', (2) a Model Creation module used for the purpose of generating a 'Specific Workflow', (3) a Model Calibration module used as a 'Data Conditioner', and (4) a Solutions module used as a 'Decision Tool'. Those modules are supported by a Workflow Storage database which includes a background knowledge database and processes guidance system. According to the 'execution type' (e.g., sequential or real-time) and a chosen 'User-objective' which is provided by a user (e.g., Completion Optimization, Stimulation Optimization, Data Valuation, Test Design, Well Reserve & Recovery Estimator, etc), the user will provide 'input data' guided by a 'specific workflow' representing the selected solution workflow. Data Entry (which provides the 'input data') will provide options to the user, including knowledge base and constant property values. When the 'input data' is introduced by the user into the Data Entry module and when the 'User-objective' is provided by the user, a 'specific workflow' will be generated in the Model Creation module wherein a reservoir model around the subject well will be built automatically. The user, as an option, can guide the reservoir model building. Based on the ranges of input data, possible realizations of the reservoir model will be built and provided to the user for selection. The SWPM software will offer a selection methodology or alternatively, the user may choose to retain all realizations. When the 'specific workflow' model is generated in the Model Creation module, a 'Data Conditioner' will be provided wherein validation of the model (represented by the 'specific workflow') to observed transient and/or production data will be available in the Model Calibration module. When the representative reservoir flow model is in place (i.e., the 'Data Conditioner' has completed its function), the simulator can now be used to achieve the original objective selected at the beginning of the session. Alternatively, the user can choose to investigate other optimization scenarios in the Solutions module, also known as the 'Decision Tool'. A set of results are generated by the 'Decision Tool' in the Solutions module. The set of results generated by the 'Decision Tool' in the Solutions module include a series of predictions which are based on the operations and/or completion scenarios that were provided by the user. The 'real-time' version of the Single Well Predictive Model (SWPM) will be able to build consecutive predictive models for specified intervals during the drilling process. The intervals can either be manually chosen or triggered by a geological/petrophysical (rock-fluid) property. Predictive models built during a drilling operation will be saved and be accessible for comparative analysis. A Single Well Predictive Model (SWPM) is an integrated and intuitive software tool that will be enable the user to build the following for an oil/gas well: (1) starting from well logs and other tests, determining storage and conductivity properties in the reservoir around the well bore, (2) constructing a 3D reservoir model around the well bore, and (3) forecasting the performance of the well under various completion and production scenarios (each of these three activities can be done manually with the help of many different software tools). When this stage is reached, the model can then be used for numerous forecasts that can lead to useful decisions, such as (1) where to complete the well for optimizing production, (2) selection of well completion tubular for ensuring the planned production, (3) Modular Dynamic Tester (MDT) and Pressure Transient Test interpretations, (4) Production and pressure test design, and (5) Estimating the reserve around the well bore while drilling (this list can be expanded). The Single Well Predictive Model (SWPM) is an interactive and special guide system that will lead the user from a 'data end' to a 'decision end'. During this interactive journey, the SWPM will have access to numerous software tools in the background. The Single Well Predictive Model (SWPM) software includes: (1) a Data Conditioner, (2) a Decision Tool and (3) a Workflow Harness. The relationships between the Data Conditioner and the Decision Tool and the Workflow Harness will be discussed in the following sections of this specification.

Figure 2:
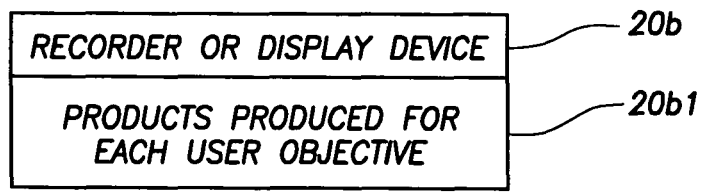
FIG. 2 illustrates the products generated by the recorder or display device of the computer system of FIG. 1.

Referring to FIGS. 1 and 2, a workstation or other computer system 20 is illustrated in FIG. 1. In FIG. 1, the workstation or other computer system 20 includes a processor 20a connected to a system bus, a recorder or display device 20b connected to the system bus, and a program storage device 20c, such as a memory 20c, connected to the system bus. The program storage device/memory 20c stores a software package therein known as the 'Single Well Predictive Model (SWPM)' software 20c1. The system bus will receive 'Input Data' 22, such as wellbore data, and the system bus will also receive a set of 'User Objectives' 24. In FIG. 2, the recorder or display device 20b of FIG. 1 will ultimately generate, produce, or display one or more 'products produced for each User Objective' 20b1. In operation, with reference to FIGS. 1 and 2, a user will enter the following information into the workstation/computer system 20 of FIG. 1: the 'Input Data' 22 and the 'User Objectives' 24. When the user provides both the 'Input Data' 22 and the set of 'User Objectives' 24, the processor 20a of the workstation/computer system 20 will execute the 'Single Well Predictive Model' software 20c1 (hereinafter, the SWPM software 20c1) and, when that execution is complete, the recorder to display device 20b of FIGS. 1 and 2 will generate, produce, or display the 'products produced for each User Objective' 20b1. That is, a unique 'product' 20b1 of FIG. 2 will be generated by the recorder or display device 20b corresponding to each 'User Objective' 24. The workstation or computer system 20 of FIG. 1 may be a personal computer (PC), a workstation, or a mainframe. Examples of possible workstations include a Silicon Graphics Indigo 2 workstation or a Sun SPARC workstation or a Sun ULTRA workstation or a Sun BLADE workstation. The program storage device 20c/memory 20c is a computer readable medium or a program storage device which is readable by a machine, such as the processor 20a. The processor 20a may be, for example, a microprocessor, microcontroller, or a mainframe or workstation processor. The memory 20c, which stores the SWPM software 20c1, may be, for example, a hard disk, a ROM, a CD-ROM, a DRAM, or other RAM, a flash memory, a magnetic storage, an optical storage, registers, or other volatile and/or non-volatile memory.

Figure 3:
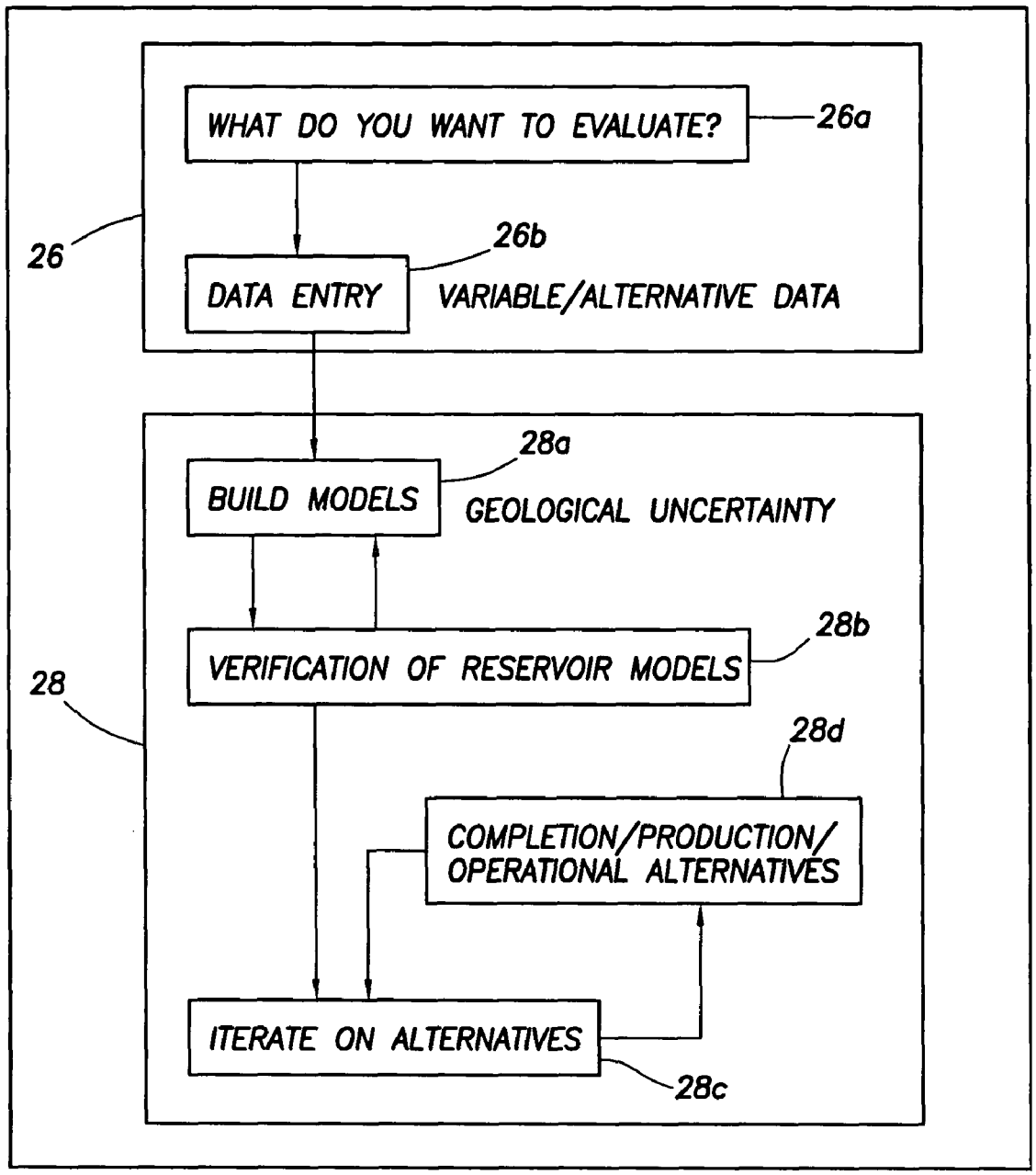
FIG. 3 illustrates a simple example of model building and its ultimate purpose which is utilized by the SWPM software based computer system of FIG. 1.

Referring to FIG. 3, a simple example of model building and its ultimate use or purpose, which is utilized by the SWPM software 20c1 stored in the software based computer system 20 of FIG. 1, is illustrated. In FIG. 3, the simple example of computer model building and its use includes a plurality of steps. In a first step 26 entitled 'variable/alternative data' 26, one must first decide 'what do you want to evaluate', step 26a. For example, what reservoir field do you want to evaluate? Then, in step 26b, the 'data entry' phase 26b will begin, the data being entered via the 'data entry' step 26b (into the computer system of FIG. 1) corresponding to the entity which one has decided, in step 26a, to evaluate. In a second step 28 entitled 'geological uncertainty', when the 'data entry' step 26b is complete, one must first 'build models' in step 28a. In step 28a, your computer models must first be constructed, and, in step 28b 'verification of reservoir models', your computer model must be verified to ensure that it will produce accurate results. Upon completion of steps 28a and 28b, a 'verified model' has been constructed and tested. The next steps 28c and 28d involve a real-time use of your 'verified model', and that real-time use of your 'verified model' will include the following activity: iterating on various completion or production or operational alternatives.

Figure 4:
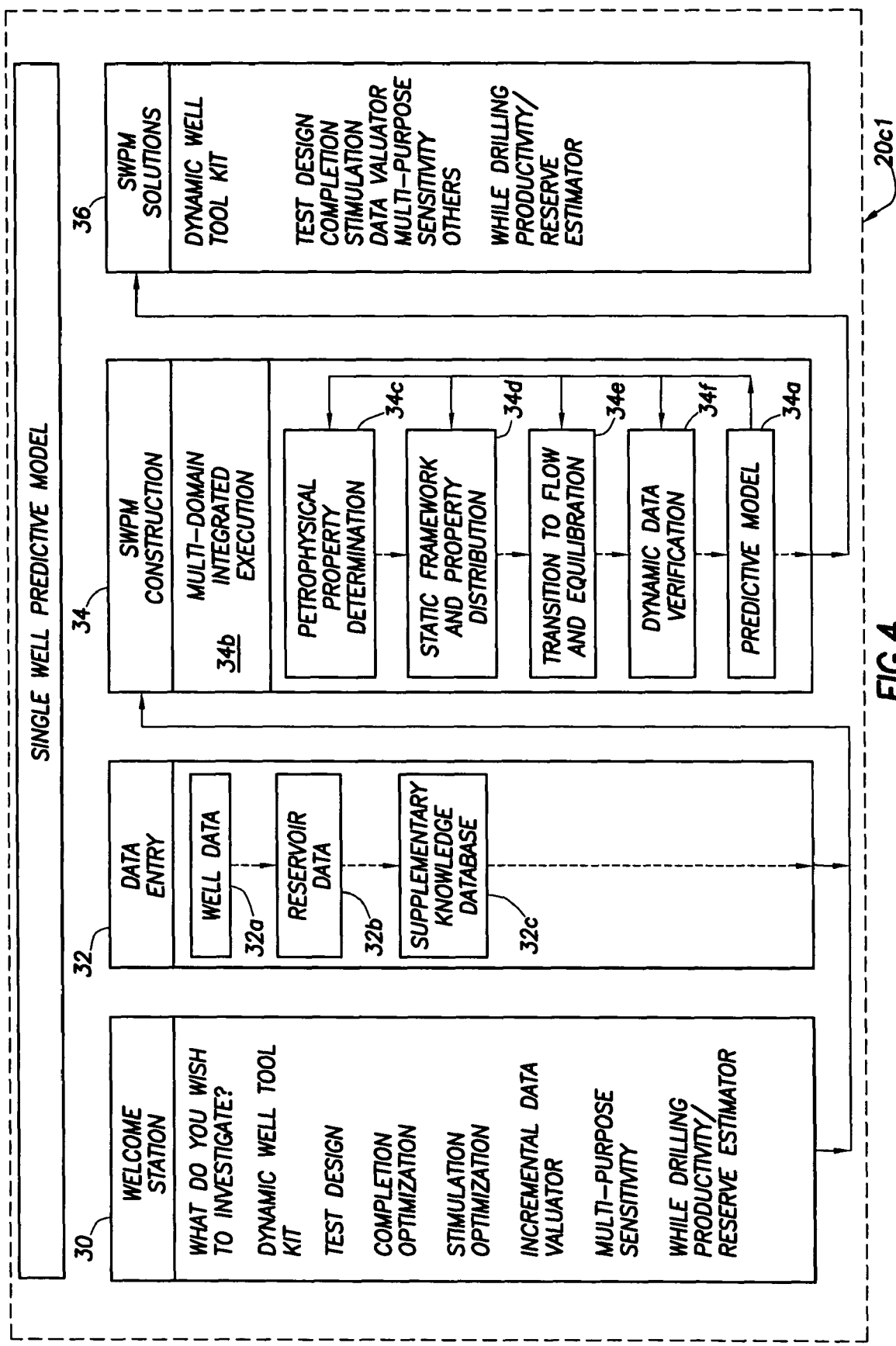
FIG. 4 illustrates a simple example of the construction and the functional operation of the SWPM software based computer system which stores the SWPM software illustrated in FIG. 1.

Referring to FIG. 4, a simple example of one aspect of the construction and the functional operation of the SWPM software based computer system 20 which stores the SWPM software 20c1 of FIG. 1 is illustrated. In FIG. 4, the Single Well Predictive Model software 20c1 of FIG. 1 includes four basic steps: (1) a welcome station 30, (2) a Data Entry step 32, (3) a single well predictive model construction and execution step 34, and (4) a solutions step 36 involving a presentation of generated 'solutions'. In the welcome station step 30 in FIG. 4, the user must decide 'what do you wish to investigate?'.

The SWPM software 20c1 is a dynamic well tool kit which will enable a user to perform: test design, completion optimization, and stimulation optimization. The SWPM 20c1 is an incremental data valuator having multi-purpose sensitivity and it can be a productivity/reserve estimator 'while drilling'. In the data entry step 32 of FIG. 4, when the user decides to investigate a 'particular entity' (such as a reservoir field) during the welcome station step 30, a plurality of 'input data' is entered into the computer system 20 of FIG. 1 corresponding to that 'particular entity', such as 'well data' 32a and 'reservoir data' 32b, thereby creating and storing a 'supplementary knowledge database' 32c. When the 'supplementary knowledge database' 32c is created during the data entry step 32 in response to a set of 'input data' provided by a user (including the aforementioned 'well data' 32a and 'reservoir data' 32b), the next step 34 involves 'model building' and using the recently-built model to perform 'multi-domain integrated execution' 34b. In the Single Well Predictive Model (SWPM) construction step 34 of FIG. 4 (also called the 'model construction and execution' step 34), a 'predictive model' 34a is constructed. When the 'predictive model' 34a is constructed, the 'input data' of step 32 (i.e., the 'well data' 32a and the 'reservoir data' 32b and other data stored in the 'supplementary knowledge database' 32c) is used to 'interrogate' the 'predictive model' 34a during the 'multi-domain integrated execution' step 34b. That is, the 'well data' 32a and the 'reservoir data' 32b stored in the 'supplementary knowledge database' 32c of step 32 are used to 'interrogate' the 'predictive model' 34a to produce a set of results, where the set of results may include: 'petrophysical property determination' 34c or 'static framework and property distribution' 34d or 'transition to Flow and Equilibration' 34e, or 'Dynamic Data Verification' 34f. The results of that 'interrogation' of the 'predictive model' 34a (including the results generated during steps 34c, 34d, 34e, and 34f) will be presented to the user during the following 'solutions' step 36. In the SWPM 'solutions' step 36, the results of the 'interrogation' of the 'predictive model' 34a, which was performed during 'model construction and execution' step 34, are presented to a user during this 'solutions' step 36. Possible 'solutions' presented during this step 36 may include test design, completion, stimulation, data valuation, sensitivity, productivity/reserve estimator while drilling, etc. However, later in this specification, it will be demonstrated that the 'predictive model' 34a will first be constructed in response to a set of 'User Objectives' and, when the 'predictive model' 34a is constructed, the 'well data' 32a and the 'reservoir data' 32b stored in the 'supplementary knowledge database' 32c of step 32 will then be used to 'interrogate' the newly constructed 'predictive model' 34a to produce the set of results. A more detailed construction of the 'Single Well Predictive Model (SWPM)' software 20c1 of FIGS. 1 and 4 will be set forth in the following paragraphs of this specification with reference to FIGS. 5 through 17 of the drawings.

Figure 5:
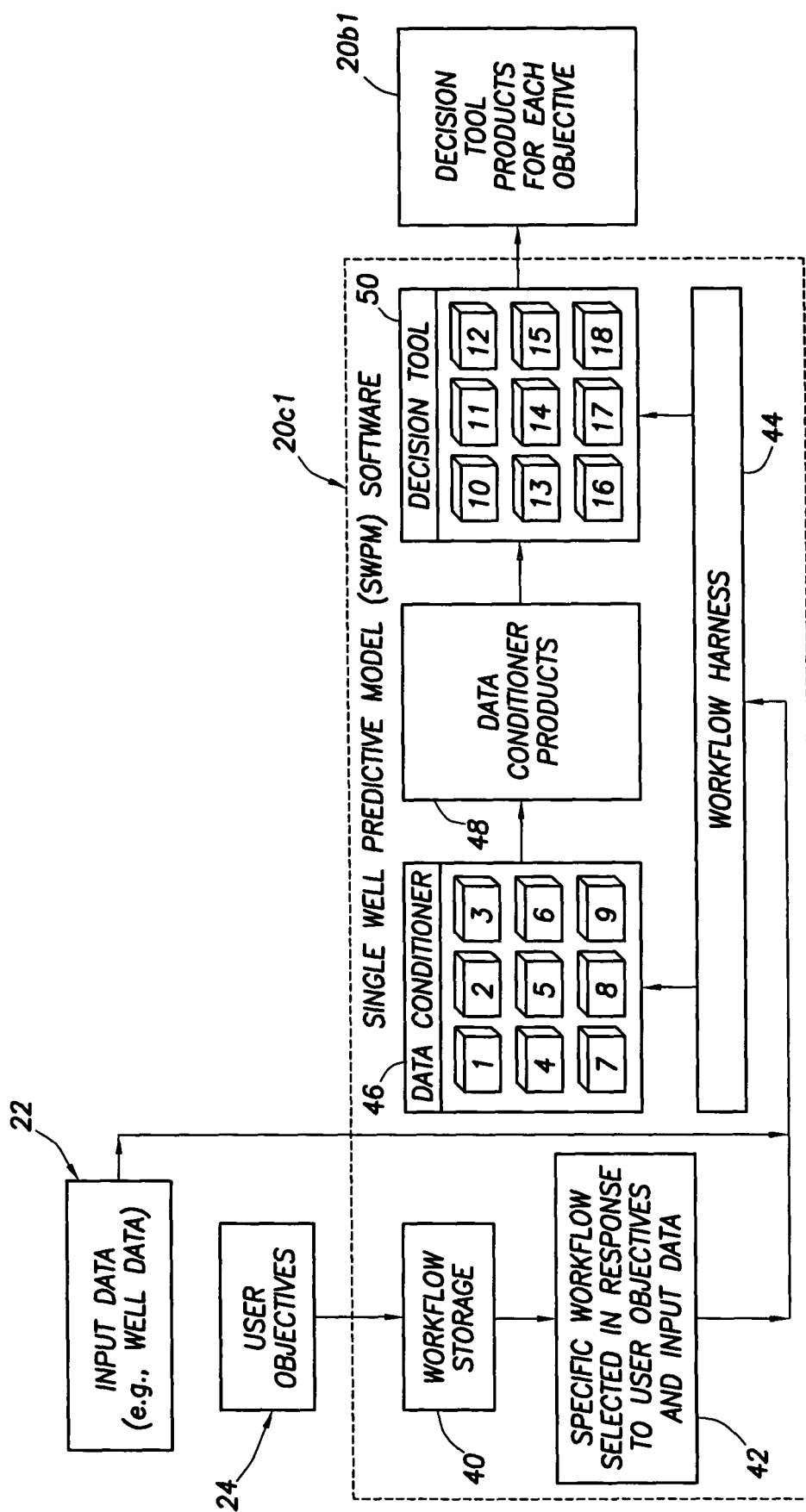
FIG. 5 illustrates a detailed construction of the SWPM software stored in the SWPM software based computer system of FIG. 1.

Referring to FIG. 5, a detailed construction of the SWPM software 20c1 of FIGS. 1 and 4 which is stored in the SWPM software based computer system 20 of FIG. 1 is illustrated. In FIG. 5, the Single Well Predictive Model (SWPM) software 20c1 includes a workflow storage 40 adapted for storing a plurality of different workflows (where the term 'workflow' will be defined below) and adapted for generating a 'specific workflow selected in response to User Objectives and input data' 42. The SWPM software 20c1 also includes a workflow harness 44 adapted for receiving the 'specific workflow' from step 42 and, responsive to that 'specific workflow' from step 42, selecting a plurality of different software modules from the Data Conditioner and the Decision Tool in response to and in accordance with that 'specific workflow' (to be discussed in greater detail in the paragraphs to follow). The SWPM software 20c1 further includes a Data Conditioner 46 which is adapted for storing therein a plurality of software modules, including the following nine software modules which are illustrated in FIG. 5 for purposes of discussion only since a multitude of software modules can be stored in the Data Conditioner 46: software module 1, software module 2, software module 3, software module 4, software module 5, software module 6, software module 7, software module 8, and software module 9. The software modules which are stored in the Data Conditioner 46 and are selected by the Workflow Harness 44 will 'condition' (e.g., calibrate) the 'Input Data' 22. When the 'Input Data' 22 is properly 'conditioned', the selected software modules stored in the Data Conditioner 46 will generate certain particular 'Data Conditioner Products' 48. The SWPM software 20c1 further includes a Decision Tool 50 which is adapted for receiving the 'Data Conditioner Products' 48 and storing therein a further plurality of software modules, including the following nine software modules which are illustrated in FIG. 5 for purposes of discussion only since a multitude of software modules can be stored in the Decision Tool 50: software module 10, software module 11, software module 12, software module 13, software module 14, software module 15, software module 16, software module 17, and software module 18. The Decision Tool 50 will ultimately generate 'Decision Tool Products for each Objective' 20b1 which represent the 'Products produced for each User Objective' 20b1 of FIG. 2. A complete description of the functional operation of the SWPM software 20c1 of FIG. 5 of the present invention will be set forth in later sections of this specification with reference to FIGS. 12 through 17 of the drawings. However, the following paragraphs of this specification with reference to FIGS. 6 through 11 will provide further details with respect to the structure and the function of the SWPM software 20c1 of FIG. 5 of the present invention.

Figure 6:
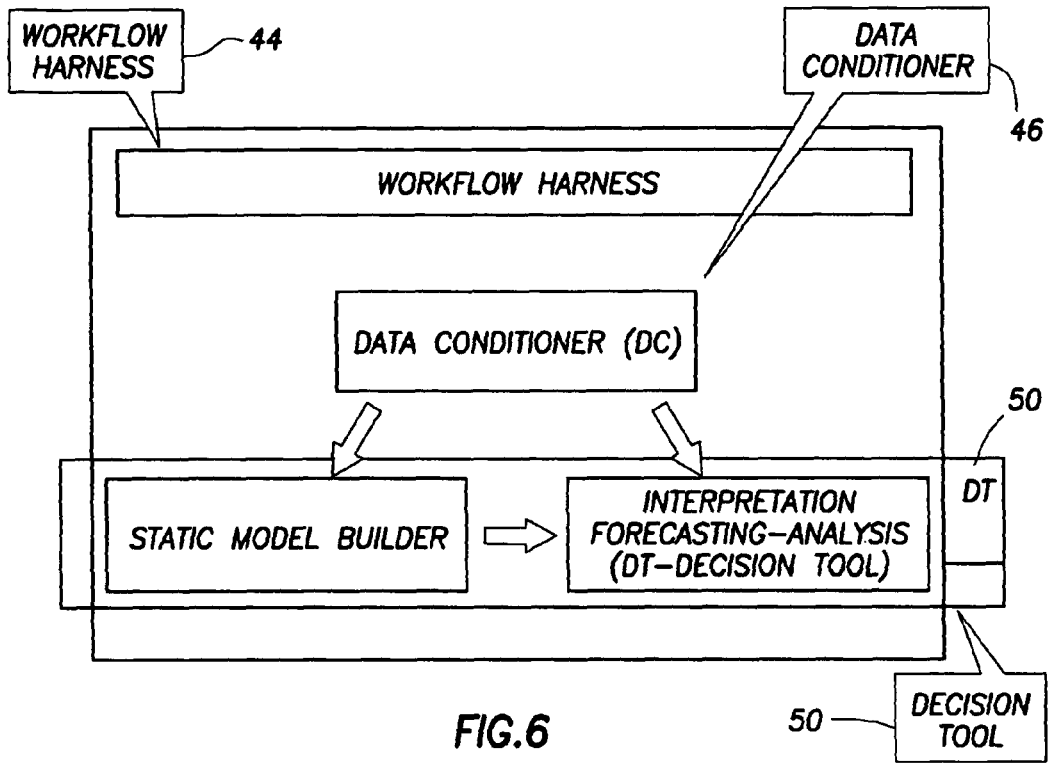
FIG. 6 illustrates the relationship between the Data Conditioner, the Decision Tool, and the Workflow Harness; this figure showing how the Data Conditioner and the Decision Tool are connected.
Figure 7:
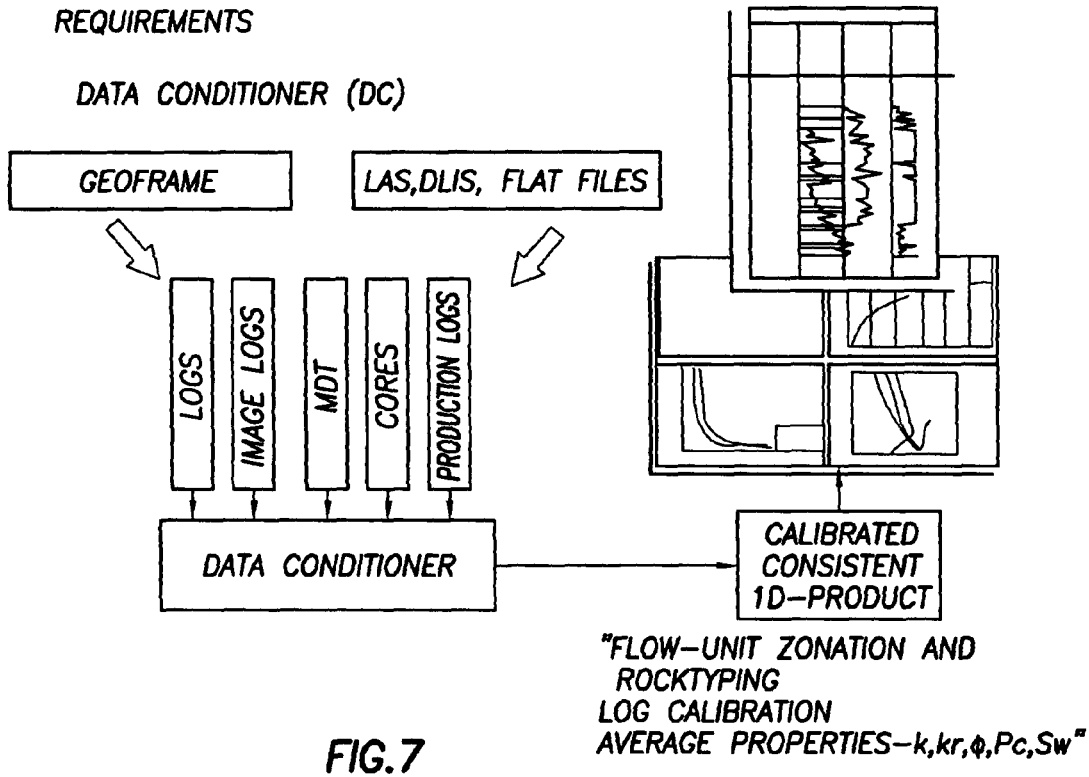
FIG. 7 illustrates a schematic diagram of the Data Conditioner; this figure illustrating how multi-domain data coming from various sources (logs, image logs, MDT measurement, cores and production logs) will be processed to create a 'calibrated consistent 1-D petrophysical static model'.
Figure 8:
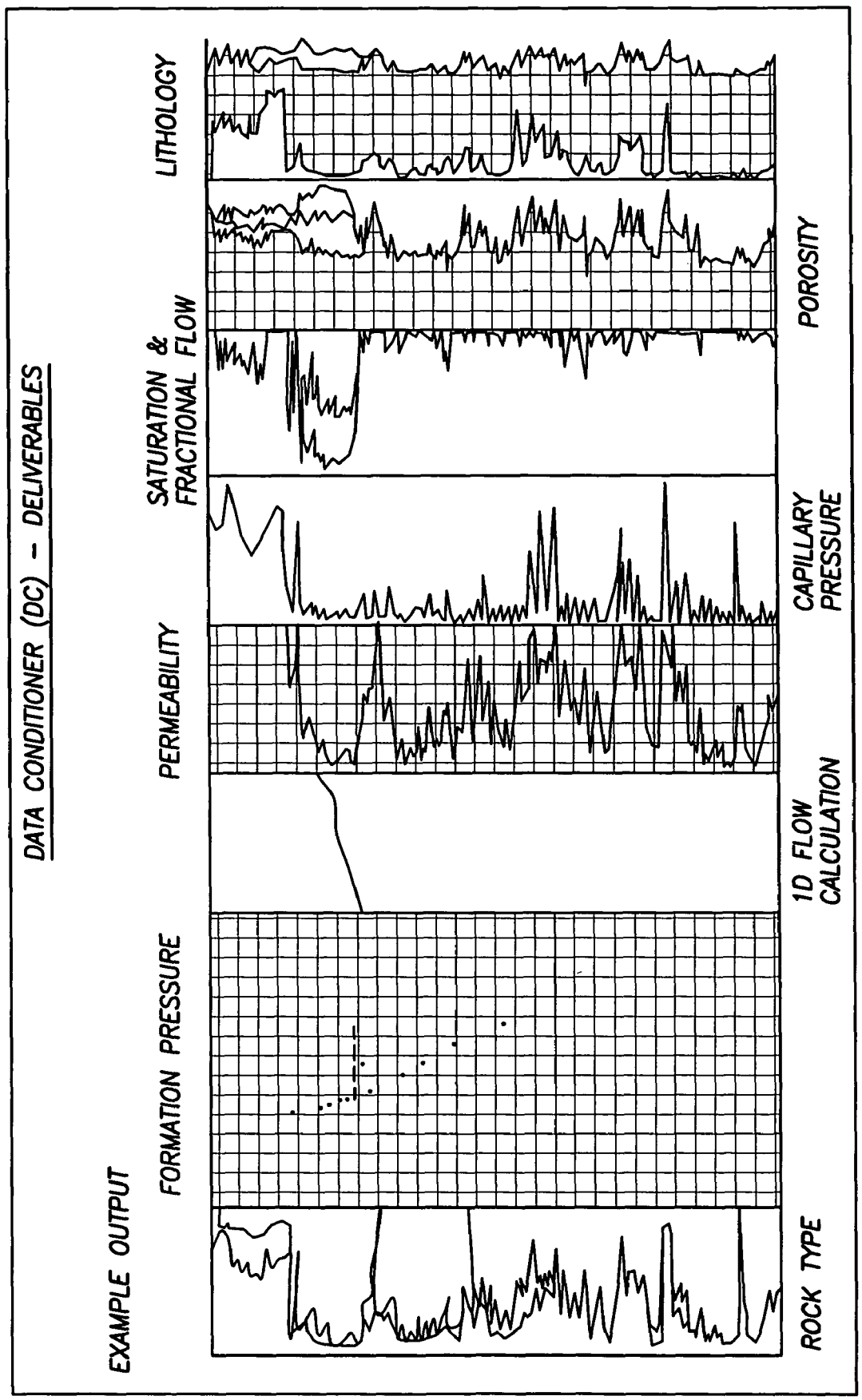
FIG. 8 illustrates the one-dimensional (1D) product of the Data Conditioner; this figure being a draft of how the Data Conditioner results are visualized.
Figure 9:
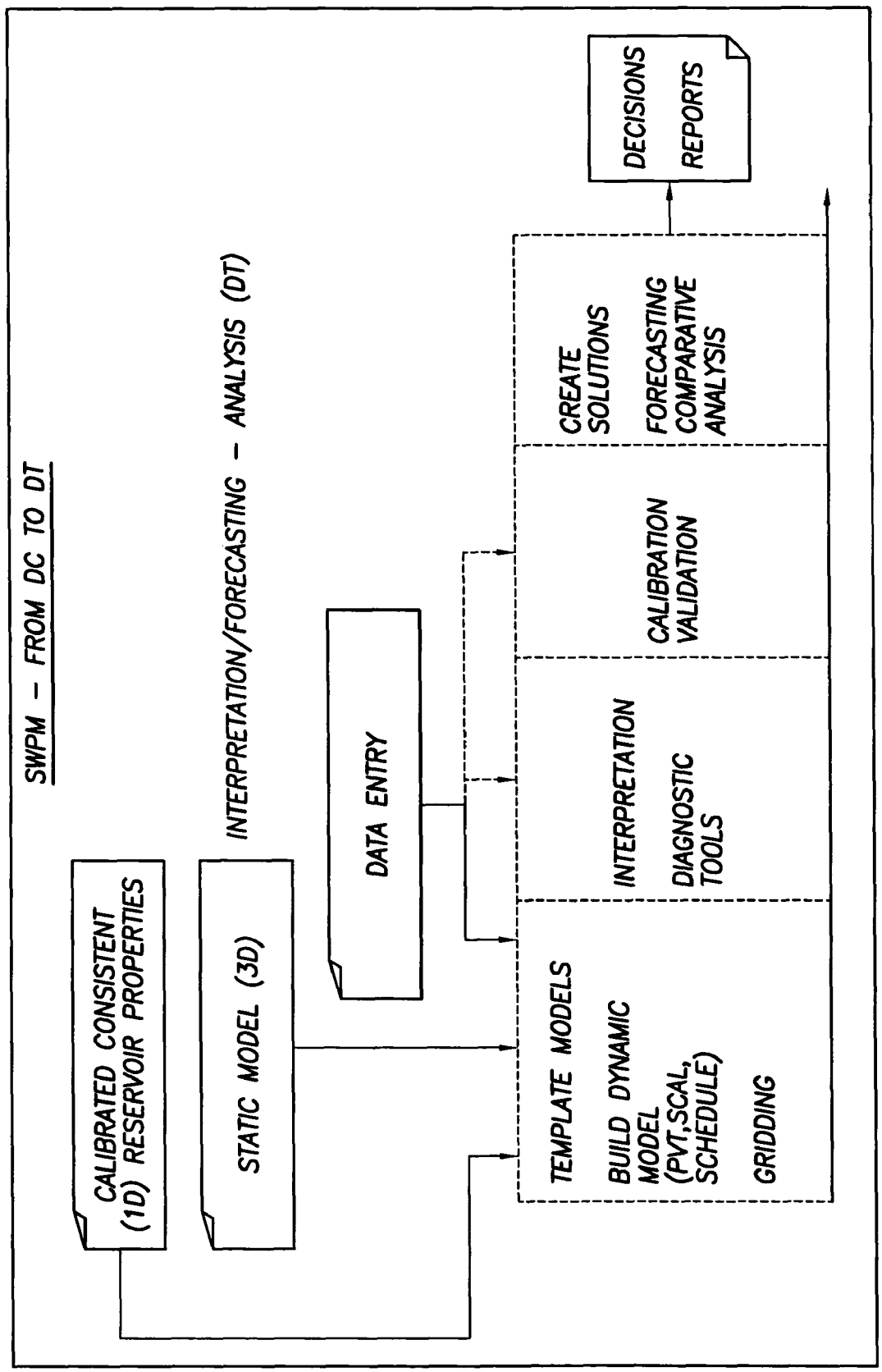
FIG. 9 illustrates the steps, within the Decision Tool, which are taken in response to the 1-D product output of the Data Conditioner shown in FIG. 8; this figure showing how the Data Conditioner and the Decision Tool are connected (a detailed version of FIG. 6); it shows the steps to be taken to create product 'decisions' out of the Decision Tool.

Referring to FIGS. 6, 7, 8, 9, and 9A, recalling that the SWPM software 20c1 of FIGS. 1, 4, and 5 include a Data Conditioner 46, a Decision Tool 50, and a Workflow Harness 44, FIG. 6 illustrates the relationships between the Data Conditioner 46, the Decision Tool 50, and the Workflow Harness 44, FIG. 6 showing how the Data Conditioner 46 and the Decision Tool 50 are connected. In FIG. 6, the Decision Tool 50 includes a Static Model Builder and an Interpretation, Forecasting, and Analysis tool. FIG. 7 illustrates how multi-domain data coming from various sources, (such as logs, image logs, Modular Dynamic Tester (MDT) measurements, cores, and production logs) will be processed to create a 'calibrated consistent 1-D petrophysical static model'. In FIG. 7, if we look at the key pieces in more detail, the Data Conditioner 46 will provide the 1D (one-dimensional) reservoir properties measured at the well bore. All data will be integrated and interpreted in the Data Conditioner 46 as the beginning of the SWPM execution. Schematically, the Data Conditioner 46 is illustrated in FIG. 7. In FIG. 8, the 1D product output of the Data Conditioner 46 is illustrated in FIG. 8. FIG. 8 shows how a 'set of results' generated by the Data Conditioner 46 will be visualized. FIG. 9 shows how the Data Conditioner 46 and the Decision Tool 50 are connected, FIG. 9 representing a detailed version of FIG. 6. In particular, FIG. 9 shows the steps to be taken to generate product 'decisions-reports' from the Decision Tool 50. In FIG. 9, the ID product output of the Data Conditioner 46 shown in FIG. 8 will begin the execution of the Decision Tool 50. The steps within the Decision Tool 50, starting with the 1D product output of the Data Conditioner 46 of FIG. 8, is illustrated in FIG. 9.

Figure 9A:
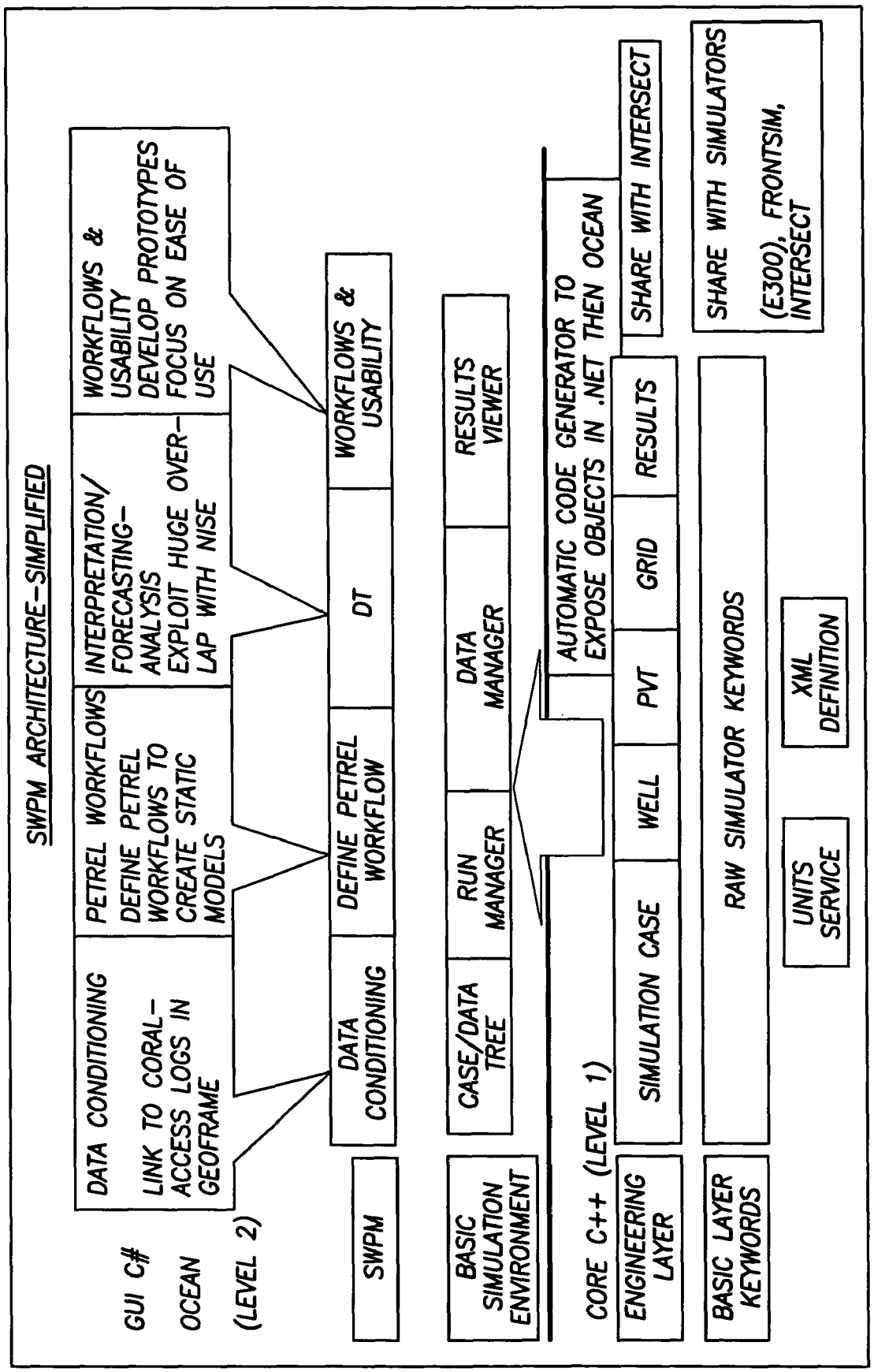
FIG. 9A illustrates the architecture of the SWPM software shown in FIGS. 1, 4-6; this figure showing how existing software and new software are organized (integrated) in a specific order to create the Single Well Predictive Model (SWPM); this basically shows the engines in the background; the SWPM will use the software in a specific order (which is set according to the Decision Tool) while executing.

The third module of the SWPM software 20c1 is the Workflow Harness 44. The Workflow Harness 44 will guide the user from the beginning of the session to the end. Once the user chooses the 'User Objective' from the list provided by the Workflow Harness 44, the Workflow Harness 44 will then call for an 'appropriate workflow' from within a database, and the execution of the SWPM software 20c1 will follow along that 'appropriate workflow'. The 'appropriate workflow' will call numerous application softwares in the right and optimum order. The input/output protocol from one application software to another will also be arranged by the Workflow Harness 44. FIG. 9A shows how a plurality of 'software modules' are organized or integrated together in a specific order or arrangement to thereby create a Single Well Predictive Model (SWPM). FIG. 9A basically shows the 'software modules' in the background. The SWPM will use the 'software modules' in a 'specific order' while executing. The 'specific order' is established by the Decision Tool. In FIG. 9A, from a software structure point of view, a simplified illustration of the architecture of the SWPM software 20c1 of the present invention is illustrated. In FIG. 9A, the 'Basic Simulation Environment' including the 'Case/Data Tree', 'Run Manager', 'Data Manager', and 'Results Viewer' can be found in U.S. patent application Ser. No. 09/270,128 filed Mar. 16, 1999, entitled "Simulation System including a Simulator and a Case Manager adapted for Organizing Data Files for the Simulator in a Tree-Like Structure", the disclosure of which is incorporated by reference into the specification of this application. In FIG. 9A, the 'SWPM' is the 'Single Well Predictive Model' software 20c1 disclosed in this specification.

Figure 10:
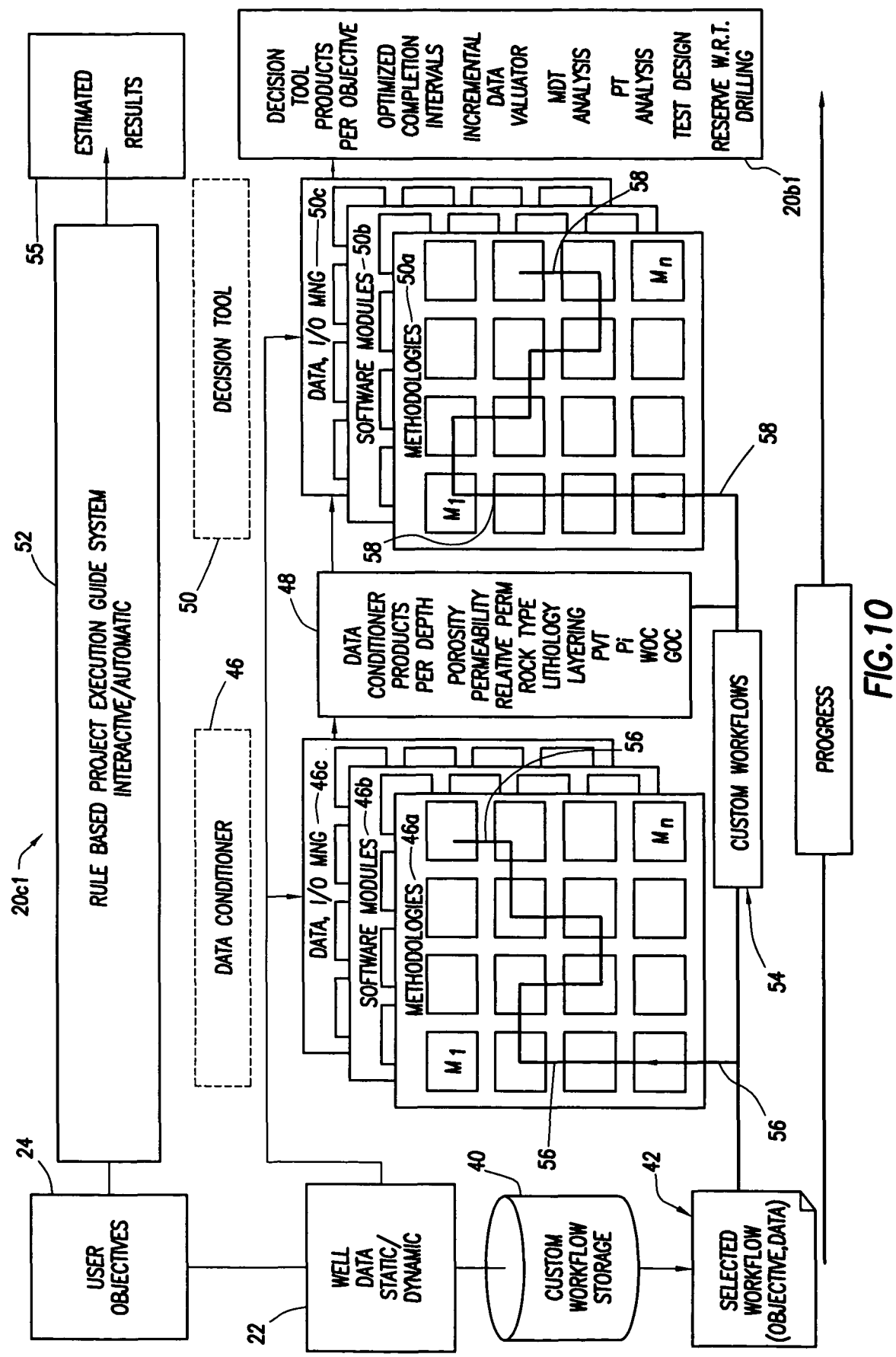
FIGS. 10 and 11 illustrate a more detailed construction and functional operation of the SWPM software stored in the SWPM software based computer system of FIG. 1.
Figure 11:
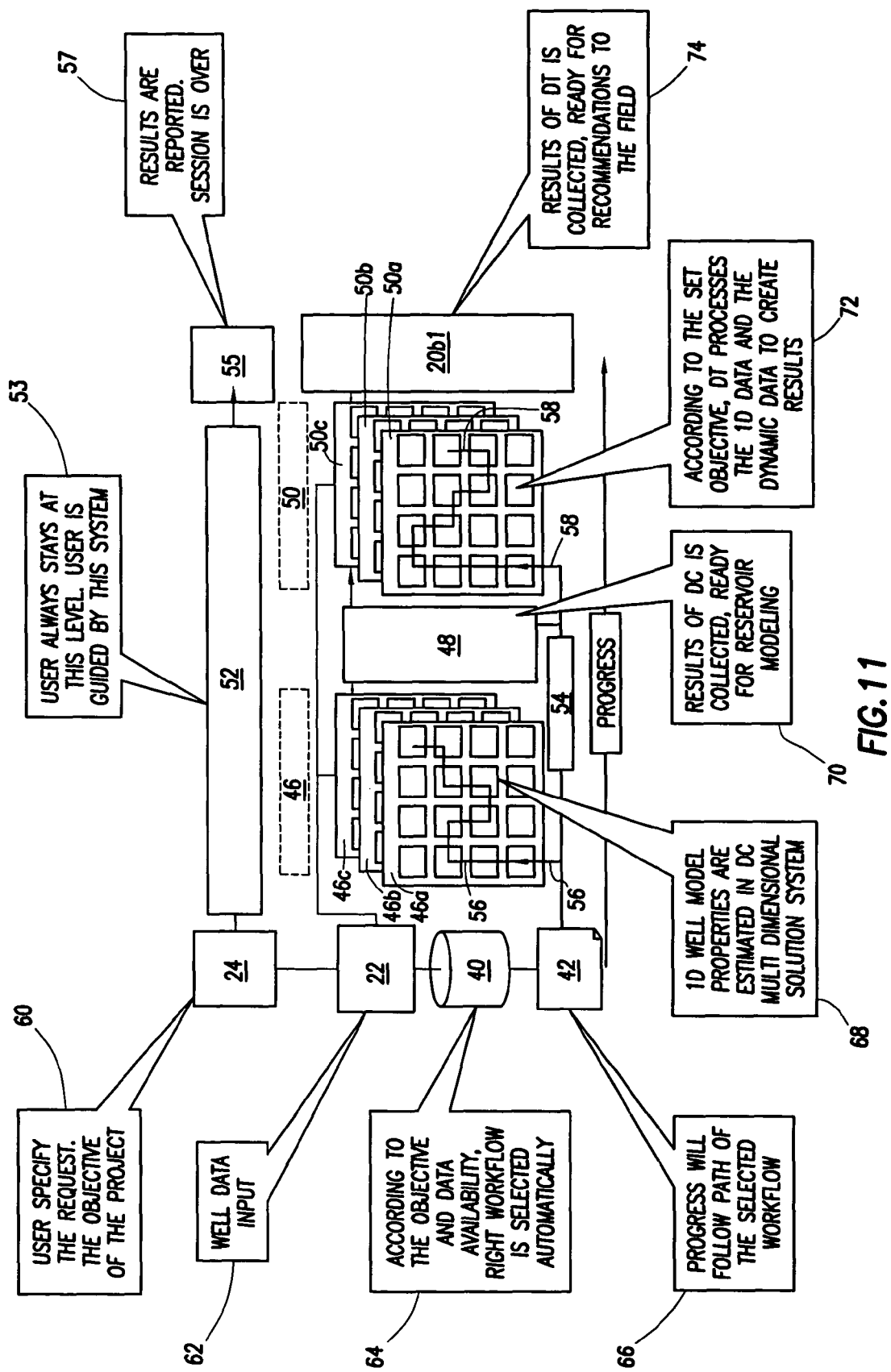

Referring to FIGS. 10 and 11, a more detailed construction of the structure and the functional operation of the SWPM software 20c1 stored in the SWPM software based computer system 20 of FIGS. 1 and 5 is illustrated. In FIG. 10, the SWPM software 20c1 includes the introduction, by a user, of a set of User Objectives 24.

In FIGS. 10 and 11, when the User Objectives 24 are input to the SWPM computer system 20 of FIG. 1, the user will interactively monitor the progress of the execution of the SWPM software 20c1 via the 'Rule Based Project Execution Guide System—Interactive/Automatic' 52. When the user interactively monitors the progress of execution of the SWPM software 20c1 via the 'Rule Based Project Execution Guide System' 52, the user always stays at that level, since the user is guided by the system, as indicated by step 53 of FIG. 11. Estimated results 55 are generated, as indicated by step 55 of FIGS. 10 and 11. The results 55 are reported, and the session is over, as indicated by step 57 in FIG. 11.

In FIGS. 10 and 11, in addition to the set of User Objectives 24, the user will also provide the 'input data' represented by the 'well data' step 22 in FIG. 10. In response to the User Objectives 24 and the 'well data' 22, a 'selected workflow' 42 will be chosen from a plurality of workflows stored in the 'custom workflow storage' 40, the 'selected workflow' 42 representing a 'custom workflow' 54. The 'custom workflow' 54 will execute a 'first plurality of selected software modules' which exist along a first path 56 in the Data Conditioner 46 thereby generating the Data Conditioner Products (per depth) 48, and the 'custom workflow' 54 will also execute a 'second plurality of selected software modules' which exist along a second path 58. The Data Conditioner Products 48, per unit of depth, include porosity, permeability, relative permeability, rock type, lithology, layering, PVT, Pi, WOC, GOC, etc. In FIG. 10, the Data Conditioner 46 includes: (1) methodologies 46a, (2) software modules 46b, and (3) Data and Input/Output 46c. The Decision Tool 50 also includes: (1) methodologies 50a, (2) software modules 50b, and (3) Data and Input/Output 50c. In response to the 'User Objective' 24 provided by the user and the 'Well Data' also provided by the user, and when the 'first plurality of software modules' along the first path 56 are executed by the processor 20a of FIG. 1, the 'second plurality of software modules' along the second path 58 will then be executed by the processor 20a of FIG. 1. When the 'second plurality of software modules' along the second path 58 is executed, a 'Decision Tool Product' 20b1 is generated which corresponds to the 'User Objective' 24 which is selected and provided by the user. In FIG. 11, the aforementioned functional operation of the SWPM software 20c1 discussed above with reference to FIG. 10 (whereby a 'User Objective' 24 and 'Input Data' in the form of 'Well Data' 22 are provided by the user and, responsive thereto, a corresponding 'custom workflow' 54 is generated from the workflow storage 40, the 'custom workflow' 54 being executed along two paths 56 and 58 in the Data Conditioner 46 and the Decision Tool 50 thereby generating 'Decision Tool Products' 20b1) is illustrated again in FIG. 11. In FIG. 11, a plurality of 'steps' associated with the functional operation of the SWPM software based computer system 20 of FIG. 1 which occurs when the SWPM software 20c1 is executed will be discussed below. In FIG. 11, step 60 in connection with the 'User Objectives' 24 indicates that the user must first introduce information corresponding to the 'request' where the term 'request' means the 'objective of the project' or the 'User Objective' 24. Step 62 indicates that 'input data' in the form of 'well data' 22 must then be introduced into the SWPM software based computer system 20 of FIG. 1. Step 64 indicates that, in response to the 'request' or 'User Objective' 24 and the 'input data' or the 'well data' 22 provided by the user and entered into the SWPM software based computer system 20 of FIG. 1, the appropriate 'workflow' is automatically selected from the 'workflow storage' 42. Step 66 indicates that 'progress' will follow the path of the 'selected workflow'; that is, a 'first plurality of software modules' will be selected from the Data Conditioner 46 and a 'second plurality of software modules' will be selected from the Decision Tool 50 in accordance with the 'selected workflow', the 'first plurality of software modules' and the 'second plurality of software modules' being executed in sequence by the processor 20a of the SWPM software based computer system 20 of FIG. 1. Step 68 indicates that, when the 'first plurality of software modules' of the Data Conditioner 46 are executed by the processor 20a of FIG. 1, one-dimensional (ID) well model properties are estimated in the Data Conditioner 46 'multi dimensional solution system'. Step 70 indicates that, when the 'first plurality of software modules' of the Data Conditioner 46 are executed by the processor 20a of FIG. 1 and when the resultant one-dimensional (ID) well model properties are estimated in the Data Conditioner 46 'multi dimensional solution system' in response to the completion of the execution of the 'first plurality of software modules' of the Data Conditioner 46, a 'set of results' which are produced by the Data Conditioner 46 are collected in the Data Conditioner Products 48, that 'set of results' being ready for use in connection with 'reservoir modeling'. Step 72 indicates that, in response to the 'set of results' which have been collected in the Data Conditioner Products 48, the 'second plurality of software modules' in the Decision Tool 50 (which were selected from among other software modules in the Decision Tool 50 in accordance with the 'selected workflow' 42) will be executed in sequence by the processor 20a of FIG. 1 in accordance with the established 'User Objective' 24, and, as a result, processing within the Decision Tool 50 of the one-dimensional (ID) data and other dynamic data will now begin. Step 74 indicates that, when the processing within the Decision Tool 50 of the one-dimensional (ID) data and other dynamic data is complete, a 'second set of results' is generated by the Decision Tool 50 is collected, the 'second set of results' being ready for use for the ultimate purpose of formulating one or more recommendations which can be made to field personnel.

Referring to FIGS. 12 through 17, a functional description of the operation of the Single Well Predictive Model (SWPM) software based computer system 20 of FIG. 1, including the Single Well Predictive Model (SWPM) software 20c1 of FIGS. 1 and 5 stored in the computer system 20, will be set forth in the following paragraphs with reference to FIGS. 12 through 17 of the drawings.

In FIGS. 12 through 17, the Single Well Predictive Model (SWPM) software 20c1 of FIGS. 1 and 5 is illustrated. The Single Well Predictive Model (SWPM) software based computer system 20 of the present invention as shown in FIG. 1, which stores the Single Well Predictive Model (SWPM) software 20c1 of the present invention will: (1) automatically produce a first specific workflow comprised of a first plurality of software modules in response to a first set of user objectives and automatically execute the first specific workflow in response to a first set of input data to produce a first desired product, and (2) automatically produce a second specific workflow comprised of a second plurality of software modules in response to a second set of user objectives and automatically execute the second specific workflow in response to a second set of input data to produce a second desired product. As a result, there is no longer any need to separately and independently execute the first plurality of software modules of the first workflow in order to produce the first desired product, and there is no longer any need to separately and independently execute the second plurality of software modules of the second workflow in order to produce the second desired product. As a result, a considerable amount of processor execution time is saved and, in addition, there is no longer any need to perform the aforementioned laborious task of separately and independently executing a plurality of software modules in order to produce a final desired product.

In FIGS. 12-17, recall that the Single Well Predictive Model (SWPM) software 20c1 of FIGS. 1, 5, and 12-17 includes a Data Conditioner 46 which generates Data Conditioner Products 48, a Decision Tool 50, and a Workflow Harness 44 operatively connected to the Data Conditioner 46 and the Decision Tool 50, the function of which will be discussed below.

Figure 12:
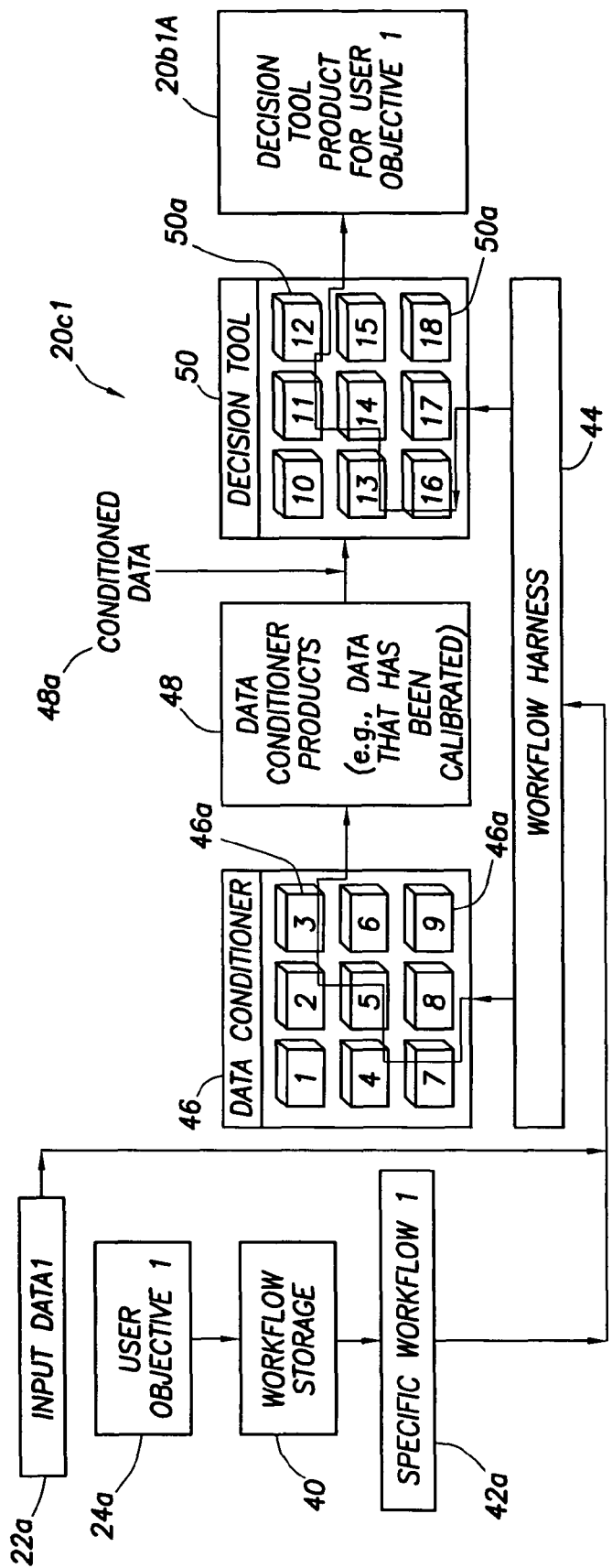
FIGS. 12 through 17 illustrate examples of the functional operation of the SWPM software based computer system of FIG. 1 which stores the SWPM software of the present invention shown in FIGS. 5, 10, and 11.

In FIG. 12, assume that the user introduces, as input data, the following information into the Single Well Predictive Model (SWPM) software based computer system 20 of FIG. 1: (1) a first set of User Objectives (i.e., User Objective 1) 24a, and (2) a first set of Input Data (i.e., Input Data 1) 22a. The first set of Input Data 22a are input to the workflow harness 44. The first set of User Objectives 24a are input to the Workflow Storage 40, and, responsive thereto, a first specific workflow (specific workflow 1) 42a corresponding to the first set of User Objectives 24a is generated from the workflow storage 40, the first specific workflow 42a being input to the Workflow Harness 44. Recall that the Data Conditioner 46 includes a 'first plurality of software modules' 46a including the following software modules: software module 1, software module 2, software module 3, software module 4, software module 5, software module 6, software module 7, software module 8, and software module 9. Recall that the Decision Tool 50 includes a 'second plurality of software modules' 50a including the following software modules: software module 10, software module 11, software module 12, software module 13, software module 14, software module 15, software module 16, software module 17, and software module 18. In response to the first specific workflow 42a, the workflow harness 44 will choose 'certain selected ones of the first plurality of software modules' 7, 4, 5, 2, and 3 embodied within the Data Conditioner 46. In FIG. 12, the 'certain selected ones of the first plurality of software modules' 7, 4, 5, 2, and 3 consist of the following software modules: software module 7, software module 4, software module 5, software module 2, and software module 3. Then, in response to the first specific workflow 42a, the workflow harness 44 will also choose 'certain selected ones of the second plurality of software modules' 16, 13, 14, 11, and 12 embodied within the Decision Tool 50. The 'certain selected ones of the second plurality of software modules' 16, 13, 14, 11, and 12 consist of the following software modules: software module 16, software module 13, software module 14, software module 11, and software module 12. The 'certain selected ones of the first plurality of software modules' 7, 4, 5, 2, and 3 embodied within the Data Conditioner 46 will be executed first by the processor 20a of the computer system 20 of FIG. 1 in response to the 'Input Data 1' 22a thereby generating the Data Conditioner Products 48. The Data Conditioner Products 48 will include and will therefore generate a set of 'Conditioned Data' 48a (e.g., calibrated data). Then, in response to the 'Conditioned Data' 48a, the 'certain selected ones of the second plurality of software modules' 16, 13, 14, 11, and 12 embodied within the Decision Tool 50 will then be executed by the processor 20a of the computer system 20 of FIG. 1 (while using the Conditioned Data 48a) thereby generating the 'Decision Tool Product for User Objective 1' 20b1A.

Figure 13:
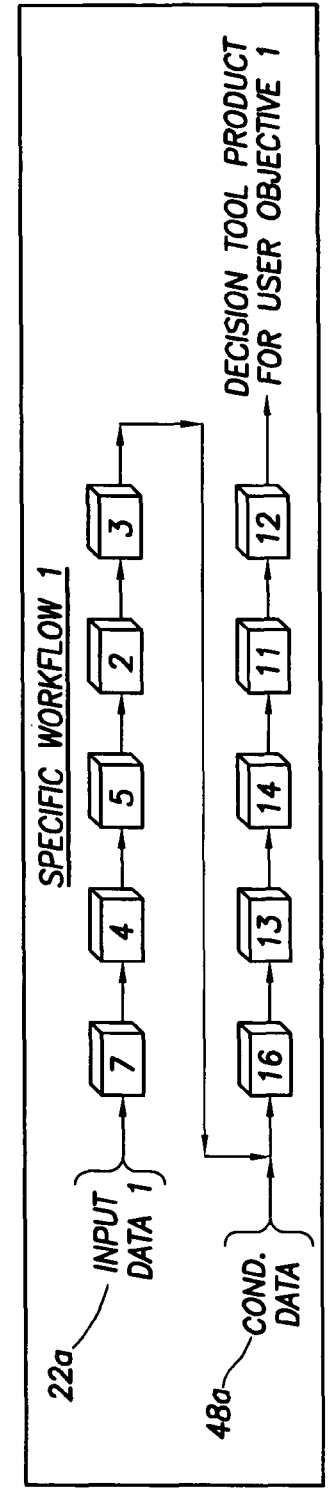

In FIG. 13, the 'specific workflow 1' 42a of FIG. 12, including the 'certain selected ones of the first plurality of software modules' 7, 4, 5, 2, and 3 and the 'certain selected ones of the second plurality of software modules' 16, 13, 14, 11, and 12 which are selected from the Data Conditioner 46 and the Decision Tool 50 by the workflow harness 44 and which are executed by the processor 20a of the computer system 20 of FIG. 1, is illustrated. In FIG. 13, in response to the 'Input Data 1' 22a, the 'certain selected ones of the first plurality of software modules' 7, 4, 5, 2, and 3 are executed in sequence by processor 20a; then, in response to the 'Conditioned Data' 48a, the 'certain selected ones of the second plurality of software modules' 16, 13, 14, 11, and 12 are executed in sequence thereby generating the 'Decision Tool Product for User Objective 1' 20b1 A.

In FIGS. 12-13, the user introduced a first user objective (User Objective 1) and a first set of input data (Input Data 1) for the purpose of ultimately generating the 'Decision Tool Product for User Objective 1' 20b1A. In the following paragraphs, assume that the user introduces a second user objective (User Objective 2) and a second set of input data (Input Data 2) for the purpose of ultimately generating a 'Decision Tool Product for User Objective 2' 20b1 B.

Figure 14:
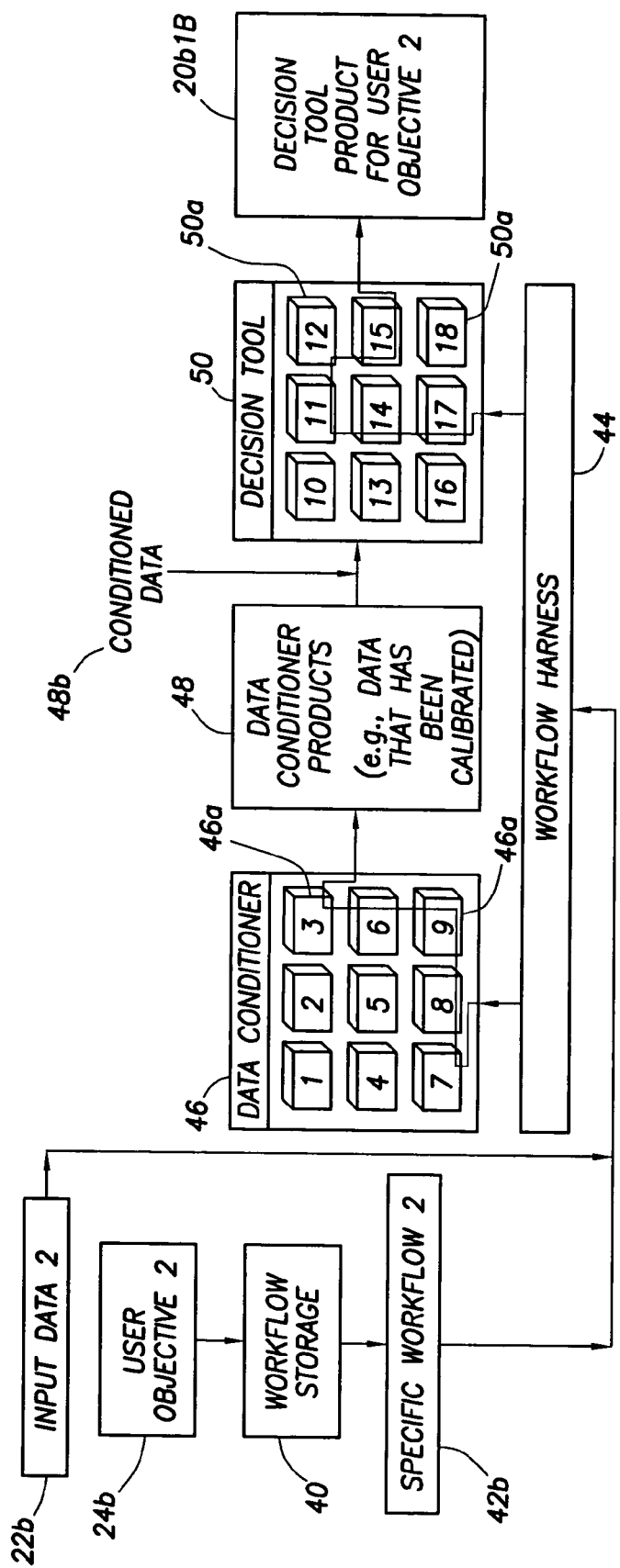

In FIG. 14, assume that the user introduces, as input data, the following information into the Single Well Predictive Model (SWPM) software based computer system 20 of FIG. 1: (1) a second set of User Objectives (i.e., User Objective 2) 24b, and (2) a second set of Input Data (i.e., Input Data 2) 22b. The second set of Input Data 22b are input to the workflow harness 44. The second set of User Objectives 24b are input to the Workflow Storage 40, and, responsive thereto, a second specific workflow (specific workflow 2) 42b corresponding to the second set of User Objectives 24b is generated from the workflow storage 40, the second specific workflow 42b being input to the Workflow Harness 44. Recall that the Data Conditioner 46 includes a 'first plurality of software modules' 46a including the following software modules: software module 1, software module 2, software module 3, software module 4, software module 5, software module 6, software module 7, software module 8, and software module 9. Recall that the Decision Tool 50 includes a 'second plurality of software modules' 50a including the following software modules: software module 10, software module 11, software module 12, software module 13, software module 14, software module 15, software module 16, software module 17, and software module 18. In response to the second specific workflow 42b, the workflow harness 44 will choose 'certain selected ones of the first plurality of software modules' 7, 8, 9, 6, and 3 embodied within the Data Conditioner 46. In FIG. 14, the 'certain selected ones of the first plurality of software modules' 7, 8, 9, 6, and 3 consist of the following software modules: software module 7, software module 8, software module 9, software module 6, and software module 3. Then, in response to the second specific workflow 42b, the workflow harness 44 will also choose 'certain selected ones of the second plurality of software modules' 17, 14, 11, 12, and 15 embodied within the Decision Tool 50. The 'certain selected ones of the second plurality of software modules' 17, 14, 11, 12, and 15 consist of the following software modules: software module 17, software module 14, software module 11, software module 12, and software module 15: The 'certain selected ones of the first plurality of software modules' 7, 8, 9, 6, and 3 embodied within the Data Conditioner 46 will be executed in sequence by the processor 20a of the computer system 20 of FIG. 1 in response to the 'Input Data 2' 22b thereby generating the Data Conditioner Products 48. The Data Conditioner Products 48 will include and will therefore generate a set of 'Conditioned Data' 48b (e.g., calibrated data). Then, in response to the 'Conditioned Data' 48b, the 'certain selected ones of the second plurality of software modules' 17, 14, 11, 12, and 15 embodied within the Decision Tool 50 will then be executed in sequence by the processor 20a of the computer system 20 of FIG. 1 (while using the Conditioned Data 48b) thereby generating the 'Decision Tool Product for User Objective 2' 20b1 B.

Figure 15:
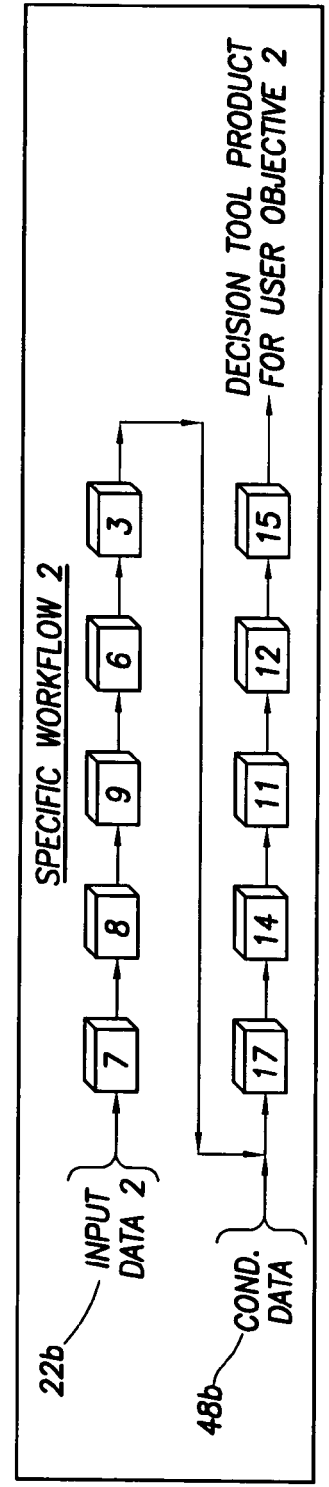

In FIG. 15, the 'specific workflow 2' 42b of FIG. 14, including the 'certain selected ones of the first plurality of software modules' 7, 8, 9, 6, and 3 and the 'certain selected ones of the second plurality of software modules' 17, 14, 11, 12, and 15 which are selected from the Data Conditioner 46 and the Decision Tool 50 by the workflow harness 44 and which are executed by the processor 20a of the computer system 20 of FIG. 1, is illustrated. In FIG. 15, in response to the 'Input Data 2' 22b, the 'certain selected ones of the first plurality of software modules' 7, 8, 9, 6, and 3 are executed in sequence by processor 20a; then, in response to the 'Conditioned Data' 48b, the 'certain selected ones of the second set of software modules' 17, 14, 11, 12, and 15 are executed in sequence thereby generating the 'Decision Tool Product for User Objective 2' 20b1B.

In FIGS. 14-15, the user introduced a second user objective (User Objective 2) and a second set of input data (Input Data 2) for the purpose of ultimately generating the 'Decision Tool Product for User Objective 2' 20b1 B. In the following paragraphs, assume that the user introduces a third user objective (User Objective 3) and a third set of input data (Input Data 3) for the purpose of ultimately generating a 'Decision Tool Product for User Objective 3' 20b1 C.

Figure 16:
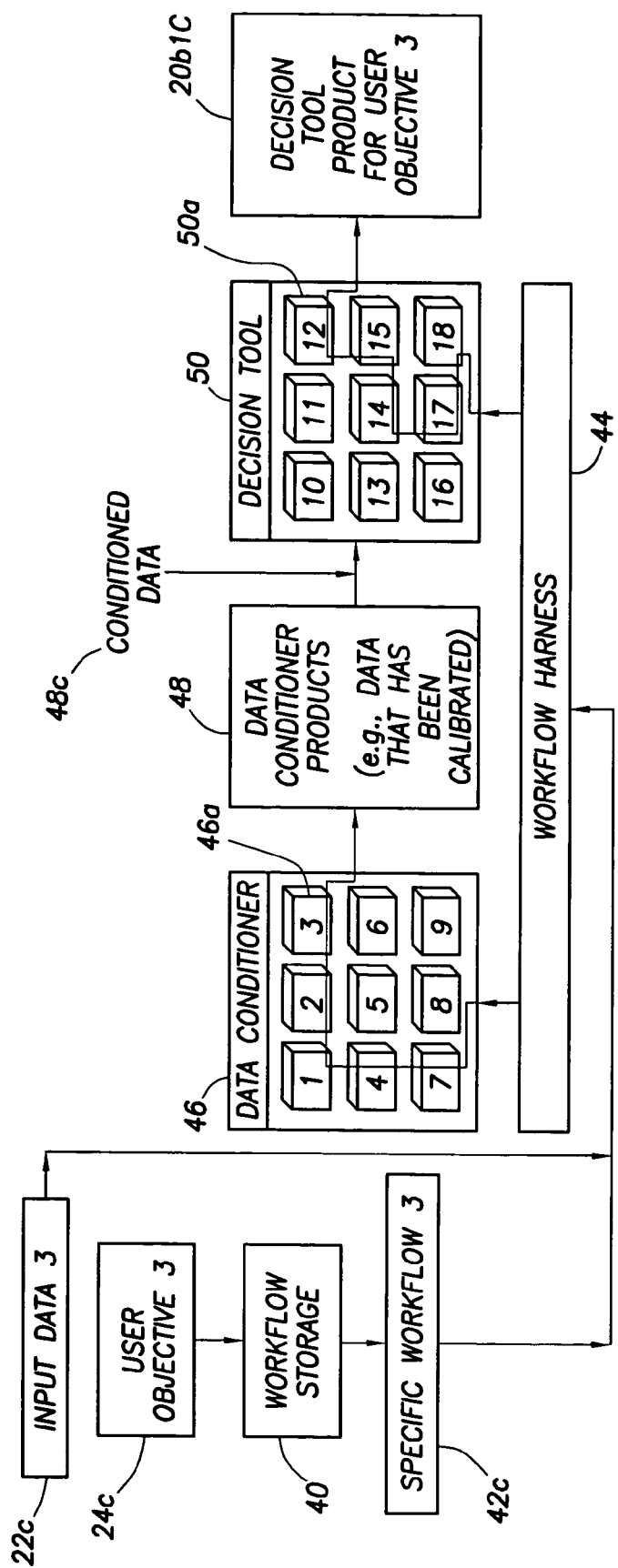

In FIG. 16, assume that the user introduces, as input data, the following information into the Single Well Predictive Model (SWPM) software based computer system 20 of FIG. 1: (1) a third set of User Objectives (i.e., User Objective 3) 24c, and (2) a third set of Input Data (i.e., Input Data 3) 22c. The third set of Input Data 22c are input to the workflow harness 44. The third set of User Objectives 24c are input to the Workflow Storage 40, and, responsive thereto, a third specific workflow (specific workflow 3) 42c corresponding to the third set of User Objectives 24c is generated from the workflow storage 40, the third specific workflow 42c being input to the Workflow Harness 44. Recall that the Data Conditioner 46 includes a 'first plurality of software modules' 46a including the following software modules: software module 1, software module 2, software module 3, software module 4, software module 5, software module 6, software module 7, software module 8, and software module 9. Recall that the Decision Tool 50 includes a 'second plurality of software modules' 50a including the following software modules: software module 10, software module 11, software module 12, software module 13, software module 14, software module 15, software module 16, software module 17, and software module 18. In response to the third specific workflow 42c, the workflow harness 44 will choose 'certain selected ones of the first plurality of software modules' 7, 4, 1, 2, and 3 embodied within the Data Conditioner 46. In FIG. 16, the 'certain selected ones of the first plurality of software modules' 7, 4, 1, 2, and 3 consist of the following software modules: software module 7, software module 4, software module 1, software module 2, and software module 3. Then, in response to the third specific workflow 42c, the workflow harness 44 will also choose 'certain selected ones of the second plurality of software modules' 18, 17, 14, 15, and 12 embodied within the Decision Tool 50. The 'certain selected ones of the second plurality of software modules' 18, 17, 14, 15, and 12 consist of the following software modules: software module 18, software module 17, software module 14, software module 15, and software module 12. The 'certain selected ones of the first plurality of software modules' 7, 4, 1, 2, and 3 embodied within the Data Conditioner 46 will be executed in sequence by the processor 20a of the computer system 20 of FIG. 1 in response to the 'Input Data 3' 22c thereby generating the Data Conditioner Products 48. The Data Conditioner Products 48 will include and will therefore generate a set of 'Conditioned Data' 48c (e.g., calibrated data). Then, in response to the 'Conditioned Data' 48c, the 'certain selected ones of the second plurality of software modules' 18, 17, 14, 15, and 12 embodied within the Decision Tool 50 will then be executed in sequence by the processor 20a of the computer system 20 of FIG. 1 (while using the Conditioned Data 48c) thereby generating the 'Decision Tool Product for User Objective 3' 20b1C.

Figure 17:
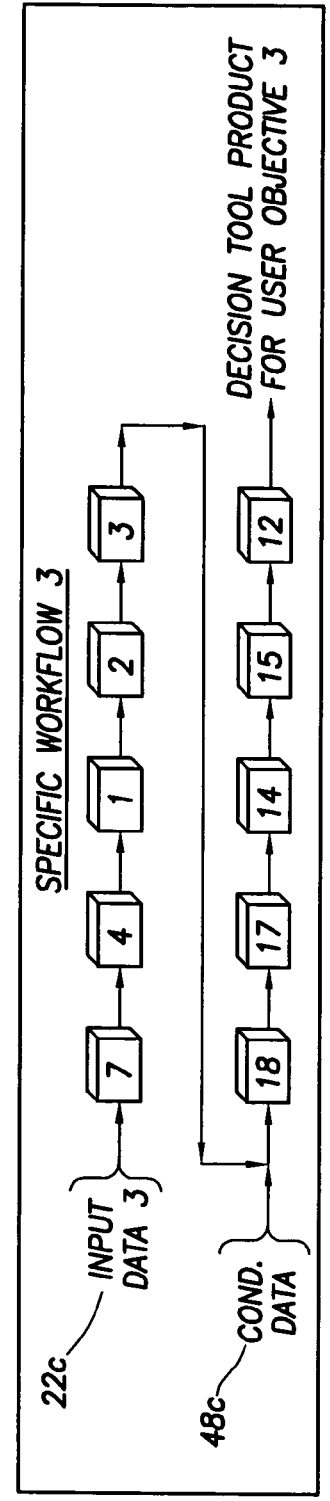

In FIG. 17, the 'specific workflow 3' 42c of FIG. 16, including the 'certain selected ones of the first plurality of software modules' 7, 4, 1, 2, and 3 and the 'certain selected ones of the second plurality of software modules' 18, 17, 14, 15, and 12 which are selected from the Data Conditioner 46 and the Decision Tool 50 by the workflow harness 44 and which are executed by the processor 20a of the computer system 20 of FIG. 1, is illustrated. In FIG. 17, in response to the 'Input Data 3' 22c, the 'certain selected ones of the first plurality of software modules' 7, 4, 1, 2, and 3 are executed in sequence by processor 20a; then, in response to the 'Conditioned Data' 48c, the 'certain selected ones of the second plurality of software modules' 18, 17, 14, 15, and 12 are executed in sequence thereby generating the 'Decision Tool Product for User Objective 3' 20b1C.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method executed by a computer of determining a desired product corresponding to a user objective, comprising the steps of:

providing a first user objective and a second user objective;

providing a first set of input data selected from one or both of wellbore data and reservoir data, and providing a second set of input data selected from one or both of wellbore data and reservoir data;

automatically generating a first workflow in response to the first user objective, and automatically generating a second workflow in response to the second user objective;

automatically selecting a first subset of software modules of a first tool and a second subset of software modules of a second tool in response to the first workflow, wherein the first subset corresponds to a first path in the first tool that defines a first order of execution of the software modules in the first subset, and wherein the second subset corresponds to a second path in the second tool that defines a second order of execution of the software modules in the second subset;

automatically selecting a third subset of software modules of the first tool and a fourth subset of software modules of the second tool in response to said second workflow, wherein the third subset is different from the first subset, and the fourth subset is different from the second subset, wherein the third subset corresponds to a third path in the first tool that defines a third order of execution of the software modules in the third subset, wherein the third path is different from the first path, wherein the fourth subset corresponds to a fourth path in the second tool that defines a fourth order of execution of the software modules in the fourth subset, and wherein the fourth path is different from the second path;

executing the software modules of the first subset according to the first path on a processor in response to said first set of input data;

executing the software modules of the second subset according to the second path on said processor in response to output from the software modules of the first subset;

executing the software modules in the third subset according to the third path on said processor in response to said second set of input data;

executing the software modules in the fourth subset according to the fourth path on said processor in response to output from the software modules of the third subset;

determining a first said desired product in response to at least executing the software modules of the first and second subsets, wherein the first said desired product includes a model of a reservoir to be produced by a well; and determining a second said desired product in response to at least executing the software modules of the third and fourth subsets, wherein the second said desired product includes another model of the reservoir.

2. A computer-readable medium readable by a computer tangibly embodying a set of instructions executable by said computer to perform method steps for determining a desired product corresponding to a user objective, said method steps comprising:

receiving a first user objective and a second user objective;

receiving a first set of input data selected from one or both of wellbore data and reservoir data, and receiving a second set of input data selected from one or both of wellbore data and reservoir data;

automatically generating a first workflow in response to the first user objective, and automatically generating a second workflow in response to the second user objective;

automatically selecting a first subset of software modules of a first tool and a second subset of software modules of a second tool in response to the first workflow, wherein the first subset corresponds to a first path in the first tool that defines a first order of execution of the software modules in the first subset, and wherein the second subset corresponds to a second path in the second tool that defines a second order of execution of the software modules in the second subset;

automatically selecting a third subset of software modules of the first tool and a fourth subset of software modules of the second tool in response to said second workflow, wherein the third subset is different from the first subset, and the fourth subset is different from the second subset, wherein the third subset corresponds to a third path in the first tool that defines a third order of execution of the software modules in the third subset, wherein the third path is different from the first path, wherein the fourth subset corresponds to a fourth path in the second tool that defines a fourth order of execution of the software modules in the fourth subset, and wherein the fourth path is different from the second path;

executing the software modules in the first subset according to the first path on a processor in response to said first set of input data;

executing the software modules of the second subset according to the second path on said processor in response to output from the software modules of the first subset;

executing the software modules in the third subset according to the third path on said processor in response to said second set of input data;

executing the software modules in the fourth subset according to the fourth path on said processor in response to output from the software modules of the third subset;

determining a first said desired product in response to at least executing the software modules of the first and second subsets, wherein the first said desired product includes a model of a reservoir to be produced by a well; and determining a second said desired product in response to at least executing the software modules of the third and fourth subsets, wherein the second said desired product includes another model of the reservoir.

3. A system responsive to a set of input data and a user objective for generating a desired product corresponding to said user objective, comprising:

first apparatus for receiving a first user objective and a first set of input data selected from one or both of wellbore data and reservoir data, and for receiving a second user objective and a second set of input data selected from one or both of wellbore data and reservoir data;

second apparatus for automatically generating a first workflow in response to the first user objective, and automatically generating a second workflow in response to the second user objective;

third apparatus for automatically selecting a first subset of software modules of a first tool and a second subset of software modules of a second tool in response to the first workflow, and automatically selecting a third subset of software modules of the first tool and a fourth subset of software modules of the second tool in response to said second workflow, wherein the third subset is different from the first subset, and the fourth subset is different from the second subset, wherein the first subset corresponds to a first path in the first tool that defines a first order of execution of the software modules in the first subset, the second subset corresponds to a second path in the second tool that defines a second order of execution of the software modules in the second subset, the third subset corresponds to a third path in the first tool that defines a third order of execution of the software modules in the third subset, and the fourth subset corresponds to a fourth path in the second tool that defines a fourth order of execution of the software modules in the fourth subset, where the third path is different from the first path, and the fourth path is different from the second path; and processor apparatus for automatically executing the software modules of the first subset according to the first path in response to said first set of input data, executing the software modules of the second subset according to the second path in response to output from the software modules of the first subset, executing the software modules of the third subset according to the third path in response to said second set of input data, executing the software modules in the fourth subset according to the fourth path in response to output from the software modules of the third subset, generating a first said desired product in response to at least execution of the software modules of the first and second subsets, and generating a second said desired product in response to at least execution of the software modules of the third and fourth subsets, wherein the first said desired product includes a model of a reservoir to be produced by a well, and wherein the second said desired product includes another model of the reservoir.

4. A method executed by a computer for determining a final product in response to a user objective, comprising the steps of:

providing a first user objective and providing first input data selected from one or both of wellbore data and reservoir data, and providing a second user objective and providing second input data selected from one or both of wellbore data and reservoir data;

generating a first workflow corresponding to said first user objective, and generating a second workflow corresponding to said second user objective;

selecting a plurality of software modules in response to said first workflow, said plurality of software modules including a first subset of software modules having a first predetermined sequence, and a second subset of software modules having a second predetermined sequence, wherein the software modules of the first subset are part of a first tool, and the software modules of the second subset are part of a second tool;

selecting a different plurality of software modules in response to said second workflow, said different plurality of software modules including a third subset of software modules having a third predetermined sequence, and a fourth subset of software modules having a fourth predetermined sequence, wherein the software modules of the third subset are part of the first tool, the software modules of the fourth subset are part of the second tool, wherein the third predetermined sequence is different from the first predetermined sequence, and the fourth predetermined sequence is different from the second predetermined sequence;

executing said software modules of the first subset in said first predetermined sequence in response to said first input data;
executing said software modules of the second subset in said second predetermined sequence in response to output of the first subset of software modules;
executing said software modules of the third subset in said third predetermined sequence in response to said second input data;
executing said software modules of the fourth subset in said fourth predetermined sequence in response to output of the third subset of software modules;
generating a first final product when the execution of said first and second subsets of software modules is complete, wherein said first final product includes a model of a reservoir to be produced by a well; and
generating a second final product when the execution of said third and fourth subsets of said software modules is complete, wherein said second final product includes another model of the reservoir.

5. The method of claim 4, wherein executing said first subset of software modules in said first predetermined sequence in response to said first input data generates first conditioned data; wherein executing said third subset of software modules in said third predetermined sequence in response to said second input data generates second conditioned data; wherein executing said second subset of software modules in said second predetermined sequence is in response to said first conditioned data; wherein executing said fourth subset of software modules in said fourth predetermined sequence is in response to said second conditioned data, said first final product being generated when the execution of said second subset of software modules in said second predetermined sequence is complete, and said second final product being generated when the execution of said fourth subset of software modules in said fourth predetermined sequence is complete.

6. A computer-readable medium readable by a computer tangibly embodying a set of instructions executable by the computer to perform method steps for determining a final product in response to a user objective, said method steps comprising:
providing a first user objective and providing first input data selected from one or both of wellbore data and reservoir data, and providing a second user objective and providing second input data selected from one or both of wellbore data and reservoir data;
generating a first workflow corresponding to said first user objective, and generating a second workflow corresponding to said second user objective;
selecting a plurality of software modules in response to said first workflow, said plurality of software modules including a first subset of software modules having a first predetermined sequence, and a second subset of software modules having a second predetermined sequence, wherein the software modules of the first subset are part of a first tool, and the software modules of the second subset are part of a second tool;
selecting a different plurality of software modules in response to said second workflow, said different plurality of software modules including a third subset of software modules having a third predetermined sequence, and a fourth subset of software modules having a fourth predetermined sequence, wherein the software modules of the third subset are part of the first tool, the software modules of the fourth subset are part of the second tool, wherein the third predetermined sequence is different from the first predetermined sequence, and the fourth predetermined sequence is different from the second predetermined sequence;
executing said software modules of the first subset in said first predetermined sequence in response to said first input data;
executing said software modules of the second subset in said second predetermined sequence in response to output of the first subset of software modules;
executing said software modules of the third subset in said third predetermined sequence in response to said second input data;
executing said software modules of the fourth subset in said fourth predetermined sequence in response to output of the third subset of software modules;
generating a first final product when the execution of said first and second subsets of software modules is complete, wherein said first final product includes a model of a reservoir to be produced by a well; and
generating a second final product when the execution of said third and fourth subsets of said software modules is complete, wherein said second final product includes another model of the reservoir.

7. The computer-readable medium of claim 6, wherein executing said first subset of software modules in said first predetermined sequence in response to said first input data generates first conditioned data; wherein executing said third subset of software modules in said third predetermined sequence in response to said second input data generates second conditioned data; wherein executing said second subset of software modules in said second predetermined sequence is in response to said first conditioned data; wherein executing said fourth subset of software modules in said fourth predetermined sequence is in response to said second conditioned data, said first final product being generated when the execution of said second subset of software modules in said second predetermined sequence is complete, and said second final product being generated when the execution of said fourth subset of software modules in said fourth predetermined sequence is complete.

8. A system for determining a final product in response to a user objective, comprising:
first apparatus for receiving a first user objective and receiving first input data selected from one or both of wellbore data and reservoir data, and for receiving a second user objective and receiving second input data selected from one or both of wellbore data and reservoir data;
second apparatus for generating a first workflow corresponding to said first user objective, and for generating a second workflow corresponding to said second user objective;
third apparatus for selecting a plurality of software modules in response to said first workflow, said plurality of software modules including a first subset of software modules having a first predetermined sequence, and a second subset of software modules having a second predetermined sequence, wherein the software modules of the first subset are part of a first tool, and the software modules of the second subset are part of a second tool; and for selecting a different plurality of software modules in response to said second workflow, said different plurality of software modules including a third subset of software modules having a third predetermined sequence, and a fourth subset of software modules having a fourth predetermined sequence, wherein the software modules of the third subset are part of the first tool, and the software modules of the fourth subset are part of the second tool, and wherein the third predetermined sequence is different from the first predetermined sequence, and the fourth predetermined sequence is different from the second predetermined sequence;

fourth apparatus for executing said software modules of the first subset in said first predetermined sequence in response to said first input data, executing said software modules of the second subset in said second predetermined sequence in response to output of the first subset of software modules, executing said software modules of the third subset in said third predetermined sequence in response to said second input data, and executing said software modules of the fourth subset in said fourth predetermined sequence in response to output of the third subset of software modules; and fifth apparatus for generating a first final product when the execution of said first and second subsets of software modules is complete, and generating a second final product when the execution of said third and fourth subsets of software modules is complete, wherein said first final product includes a model of a reservoir to be produced by a well, and wherein said second final product includes another model of the reservoir.

9. The system of claim 8, wherein the fourth apparatus for executing said first subset of software modules in said first predetermined sequence in response to said first input data generates first conditioned data; the fourth apparatus for executing said third subset of software modules in said third predetermined sequence in response to said second input data generates second condition data; the fourth apparatus for executing said second subset of software modules in said second predetermined sequence is in response to said first conditioned data; and the fourth apparatus for executing said fourth subset of software modules in said fourth predetermined sequence is in response to said second condition data, said first final product being generated when the execution of said second subset of software modules in said second predetermined sequence is complete and said second final product being generated when the execution of said fourth subset of software modules in said fourth predetermined sequence is complete.

10. The method of claim 1, wherein executing the software modules of the first subset causes conditioning of the first set of input data to provide output that includes conditioned input data.

11. The method of claim 10, wherein conditioning the first set of input data includes interpreting the first set of input data.

12. The method of claim 1, further comprising using the reservoir models to predict performance of producing from the reservoir.

13. The computer-readable medium of claim 2, wherein executing the software modules of the first subset causes conditioning of the first set of input data to provide output that includes conditioned input data.

14. The computer-readable medium of claim 13, wherein conditioning the first set of input data includes interpreting the first set of input data.

15. The computer-readable medium of claim 2, further comprising using the reservoir models to predict performance of producing from the reservoir.

16. The system of claim 3, wherein executing the software modules of the first subset causes conditioning of the first set of input data to provide output that includes conditioned input data.

17. The system of claim 16, wherein conditioning the first set of input data includes interpreting the first set of input data.

18. The system of claim 3, wherein the processor apparatus is to further use the reservoir models to predict performance of producing from the reservoir.

19. The method of claim 4, wherein executing the first subset of software modules causes conditioning of the first input data to provide output that includes conditioned input data.

20. The method of claim 19, wherein conditioning the first input data includes interpreting the first input data.

21. The method of claim 4, further comprising using the reservoir models to predict performance of producing from the reservoir.

22. The computer-readable medium of claim 6, wherein executing the first subset of software modules causes conditioning of the first input data to provide output that includes conditioned input data.

23. The computer-readable medium of claim 22, wherein conditioning the first input data includes interpreting the first input data.

24. The computer-readable medium of claim 6, wherein the method steps further comprise using the reservoir models to predict performance of producing from the reservoir.

25. The system of claim 8, wherein executing the first subset of software modules causes conditioning of the first input data to provide output that includes conditioned input data.

26. The system of claim 25, wherein conditioning the first input data includes interpreting the first input data.

27. The system of claim 8, further comprising a sixth apparatus to use the reservoir models to predict performance of producing from the reservoir.

* * * * *